(12) United States Patent
Pasquali

(10) Patent No.: US 6,636,856 B2
(45) Date of Patent: Oct. 21, 2003

(54) SYSTEM AND METHOD FOR FACILITATING A WINDOWS BASED CONTENT MANIFESTATION ENVIRONMENT WITHIN A WWW BROWSER

(75) Inventor: Sandro Pasquali, Santa Fe, NM (US)

(73) Assignee: Simple.Com Inc., Toronto (CA)

(*) Notice: Subject to any disclaimer, the term of this patent is extended or adjusted under 35 U.S.C. 154(b) by 0 days.

(21) Appl. No.: 10/025,940

(22) Filed: Dec. 26, 2001

(65) Prior Publication Data

US 2003/0069888 A1 Apr. 10, 2003

Related U.S. Application Data

(63) Continuation of application No. 09/843,130, filed on Apr. 26, 2001, now Pat. No. 6,535,882.

(51) Int. Cl.[7] .............................................. G06F 17/30
(52) U.S. Cl. ....................................... 707/10; 707/103
(58) Field of Search ............................ 707/10, 1, 2, 3, 707/9, 5, 103; 709/217

(56) References Cited

U.S. PATENT DOCUMENTS

| | | | |
|---|---|---|---|
| 5,418,950 A | 5/1995 | Li et al. ......................... | 707/4 |
| 5,913,215 A | 6/1999 | Rubinstein et al. ............ | 707/10 |
| 6,061,738 A | 5/2000 | Osaku et al. ................. | 709/245 |
| 6,064,979 A | 5/2000 | Perkowski .................... | 705/26 |
| 6,148,330 A | * 11/2000 | Puri et al. .................... | 709/217 |

OTHER PUBLICATIONS

"Desktop.com" retrieved via the Internet and World–wide Web at http://www.desktop.com—Jul. 24, 2000, 4:24PM.
Netscape Communicator 4.05, www.netscape.com, pp. 1–14.

* cited by examiner

Primary Examiner—Sanjiv Shah
(74) Attorney, Agent, or Firm—Erik B. Cherdak & Associates LLC

(57) ABSTRACT

System and method for facilitating a windowed content manifestation environment within a world wide web (WWW) browser client. The system and method include and involve a server system that is configured to serve a software system and associated content via an electronic data network such as the Internet and WWW. Also included and involved is a web browser client (web browser software application) operating within a data processing system that is coupled to said server system via the electronic data network and which instantiates a content manifestation environment. The web browser client is operative to receive the software system and the associated content via the server system, to process the software system and the associated content to produce at least one window object within the content manifestation environment. The generated window object(s) are each associated with a set of controllable attributes and are configured to manifest at least a portion of the associated content. The controllable attributes are configured to affect manifestation of the window object(s) by the web browser client within the content manifestation environment. The window object(s) generated within the content manifestation environment may be updated and loaded with content received via the electronic data network without requiring the content manifestation environment to be refreshed, and in real-time without requiring user intervention such as via hyper-link traversal.

8 Claims, 10 Drawing Sheets

SYSTEM AND METHOD FOR FACILITATING A WINDOWS BASED CONTENT MANIFESTATION ENVIRONMENT WITHIN A WWW BROWSER

This application is a continuation of application Ser. No. 09/843,130, filed Apr. 26, 2001, now U.S. Pat. No. 6,535,882.

BACKGROUND OF THE INVENTION

1. Field of the Invention

The present invention relates to systems and methods that are used to distribute and manifest content received via the Internet and World Wide Web (WWW). More particularly, the present invention relates to the dynamic manifestation of content within a WWW browser environment.

2. Description of the Related Art

The Internet and the World Wide Web (WWW) have significantly impacted the way people receive information, purchase goods and services, and generally communicate. The Internet and WWW have facilitated whole content delivery industries that provide up-to-the-minute delivery (and sale) of information such as news, weather, sports scores, horoscopes, stock and securities information, etc. Many companies have recognized the great "gold-rush" nature of the Internet and have been quick to establish web-sites where people (a.k.a. "network surfers") can visit to purchase books online, to receive specialized content such as investment and other reports, and to subscribe to content delivery services such as "electronic" newspapers and magazines. Despite the widespread use and acceptance of the Internet and the WWW, many industry analysts and insiders insist that our society has only begun to realize the advantages of publicly accessible network technologies and predict that our lives will only be further impacted by increased uses of the "Net."

At the same time that the Internet and WWW have become so widely used, the amount of content and information available and distributed via the same has grown exponentially. That volume of information has lead to significant problems for people (network surfers) in terms of locating and receiving desired content. Such problems are due in large part to the fact that while delivery technologies and systems have improved, the ability to organize, index, search, and process that content lags behind.

As such, many companies operate what are known as network indices and "search engines" and corresponding web sites. Network indices maintained at many web sites typically store expansive lists of links which may be entered manually by network users or which are gathered automatically. Search engines, on the other hand, automatically visit or "crawl" to network sites to automatically peruse content maintained thereby to build comprehensive databases (index files) that later may be scanned by network users through use of keywords via what are referred to as keyword searches.

At the internet and WWW site, www.yahoo.com. for example, network users (a.k.a. "network surfers") may select topic areas from among a pre-configured hierarchical network index tree to peruse lists of hyper-text links related to a particular field of interest (e.g., business, stocks, stock split announcements). The links found in the hierarchical network index may be manually entered by network surfers via an appropriate "add link" page, or may be entered automatically in response to automatic crawling techniques. At the Internet and WWW site, www.lycos.com, for example, network surfers are prompted with a dialog box presented within their web browser screens to enter a set of keywords. Such keywords are then submitted back to a web-site server computer system and used to form the basis of an appropriate database query against pre-built databases of indexed content. The results of such queries are presented in the form of exhaustive hyper-text links which a network surfer may select by "clicking" to cause his web browser client application (e.g., the INTERNET EXPLORER® web browser which is manufactured and marketed by MICROSOFT CORPORATION) to traverse the same.

Aside from the aforementioned problems associated with actually locating content on the Internet and WWW, the tools used to peruse that content (and, often, long list of hyper-text links) such as web browser client applications and related software programs are built to merely allow one screen-full of information to be perused at a time. For example, once a network surfer locates and accesses a content source (e.g., visits a web site containing content such as a list of related links, a news feed, stock related information, etc.) he may be faced with having to constantly refresh his web browser screen with the "next ten links," or scroll through a relatively large amount of text by using navigation buttons, scroll bars, browser application back and forward buttons, etc. Such browsing of content can be time consuming, frustrating, and often, fruitless.

Unfortunately, currently available web browser technologies and products do not effectively allow a network surfer to open a series of separate windows into which separate content streams may cause display of corresponding information. That is, while an underlying operating environment such as MICROSOFT WINDOWS 98™ may support multiple windows each displaying the results of a different program, for example, web browser tools and applications remain relatively crude in terms of their native ability to present only static and exhaustive amounts of text and content in a single content review window or environment (e.g., within a single web browser screen).

To combat the problems addressed above with regard to finding and accessing content and the limitations of the tools available to manifest the same, software developers have offered a variety of network content delivery solutions to generally enhance the web browsing experience. For example, developers have long taken advantage of the ability of web browsers to accept "plug-ins" and "helper" applications to provide for enriched content manifestation. Additionally, developers have begun to provide (serve) web content mixed with Java (and Java progeny) type code to enhance content review. And others have created web sites that cause instantiation of additional web browsers (i.e., they cause launching of additional web browser sessions within an operating system) to facilitate multiple window/browser application display of corresponding separate content streams.

An exemplary web site that seeks to ease content location (searching) and which attempts to enrich content manifestation is one maintained at www.mynetscape.com. Such an exemplary web site has become known as a "portal site" where network surfers can visit, receive content from a variety of sources (e.g., news, financial feeds, etc.), and search the web through use of a search engine like or similar to those discussed above. Moreover, at the mynetscape.com portal site as viewed through a web browser, a network surfer is presented with a set of pseudo-windows corresponding to a set of content feeds and/or information requests (e.g., such as web content search templates provided in accordance HTML instructions driven by computer graphic interface (CGI) scripts written in the PERL scripting language, etc.). Such content feeds are referred to at the mynetscape.com web site as "channels" to draw a parallel to television like stations that may be selected or viewed and even turned OFF. The pseudo-windows are drawn within a web browser screen and manifestation environment using HTML and javascript to appear like tile-type operating system windows which may be customized (changed in terms of the content that is displayed therein), maximized, minimized, and removed. For example, a "Stocks" channel (pseudo-window) may be perused for information related to certain securities markets and a headline news channel (pseudo-window) may be perused for news story highlight, etc. In each case, a channel (pseudo-window) has certain related controls which may be used to minimize, maximize, and remove the channel from view.

Although the mynetscape.com web site goes a long way to provide a multi-panel visual display of multiple content sources to attempt to facilitate easier location and review of content, it does not go far enough to deliver true window functionality like that offered within underlying operating systems. For example, unlike a true window object that dynamically displays content in an operating system context, a pseudo-window drawn within a network surfer's web browser is merely a screen section that appears to loaded with content. And that content that is drawn within a pseudo window is static and does not change after rendering by a web browser. In other words, all pseudo-windows rendered by a web browser are, in actuality, merely graphically-bordered screen sections within a web browser content manifestation window that statically display content and which must be completely re-drawn (along with all other pseudo-windows) each time a user-selectable screen-related operation/event occurs within a web browser screen (e.g., such when a single pseudo-window minimization operation is requested by a user upon the occurrence of an appropriate mouse-click event). As such, the pseudo-window functionality provided by the mynetscape.com web site and all similar type web sites are not capable of providing truly controllable windows within a single unframed web browser content manifestation environment which can display dynamic content such as live video, updated stock tickers, motion video, etc.

Thus, there exists a need to provide new and improved systems and methods to facilitate a windowed content manifestation environment within a web browser application. Such systems and methods must allow effective and efficient implementation of web sites without requiring Internet and WWW infrastructures and standards to change. To be viable, network surfers must be able to access a web site to seamlessly take advantage of such new and improved systems and methods without being required to obtain or upgrade their personal computing environments, applications, or systems.

SUMMARY OF THE INVENTION

The present invention solves the above-described problems associated with providing access to network content and with manifesting the same to enhance network (world wide web—WWW) use. In so doing, the present invention achieves certain benefits not heretofore realized with prior technologies to access and manifest content. For example, network surfers now can use conventional web browser technologies and software applications to access a portal web site that delivers content in a format that is consistent with other software platforms that operate within a user's personal data processing system. Furthermore, by providing a true windowing environment within the constraints of the Internet's infrastructure will allow content providers (e.g., web site operators) to incorporate the present invention to further enrich their sites and enhance the web usage experience. And, because a web browser content manifestation environment may now be made to manifest real content delivery windows without having to refresh a screen image each time a window is controlled, content providers and web site advertisers can cause active advertisements to be displayed and changed within a particular window without requiring a user to click a hyper-text link to purposefully access an additional web site. As such, both users and content providers alike will benefit from the present invention's new and improved content delivery model.

Accordingly, the present invention solves the aforementioned problems to deliver the above-described benefits by providing new and improved systems and methods for facilitating a windowed content manifestation environment within a world wide web (WWW) browser client. The system and method include and involve a server system that is configured to serve a software system and associated content via an electronic data network such as the Internet and WWW. Also included and involved is a web browser client (web browser software application) operating within a data processing system that is coupled to the server system via the electronic data network and which instantiates a content manifestation environment (e.g., a dynamic screen display environment within the data processing system). The web browser client is operative to receive the software system and the associated content via the server system, to process the software system and the associated content to produce at least one window object within the content manifestation environment. The generated window object(s) are each associated with a set of controllable attributes and are configured to manifest at least a portion of the associated content. The controllable attributes are configured to affect manifestation of the window object(s) by the web browser client within the content manifestation environment. The window object(s) generated within the content manifestation environment may be updated and loaded with content in real-time and without user-intervention (e.g., such as user clicks on hyper-links, etc.) received via the electronic data network without requiring the content manifestation environment to be refreshed (e.g., without requiring screen refresh operations).

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1A:
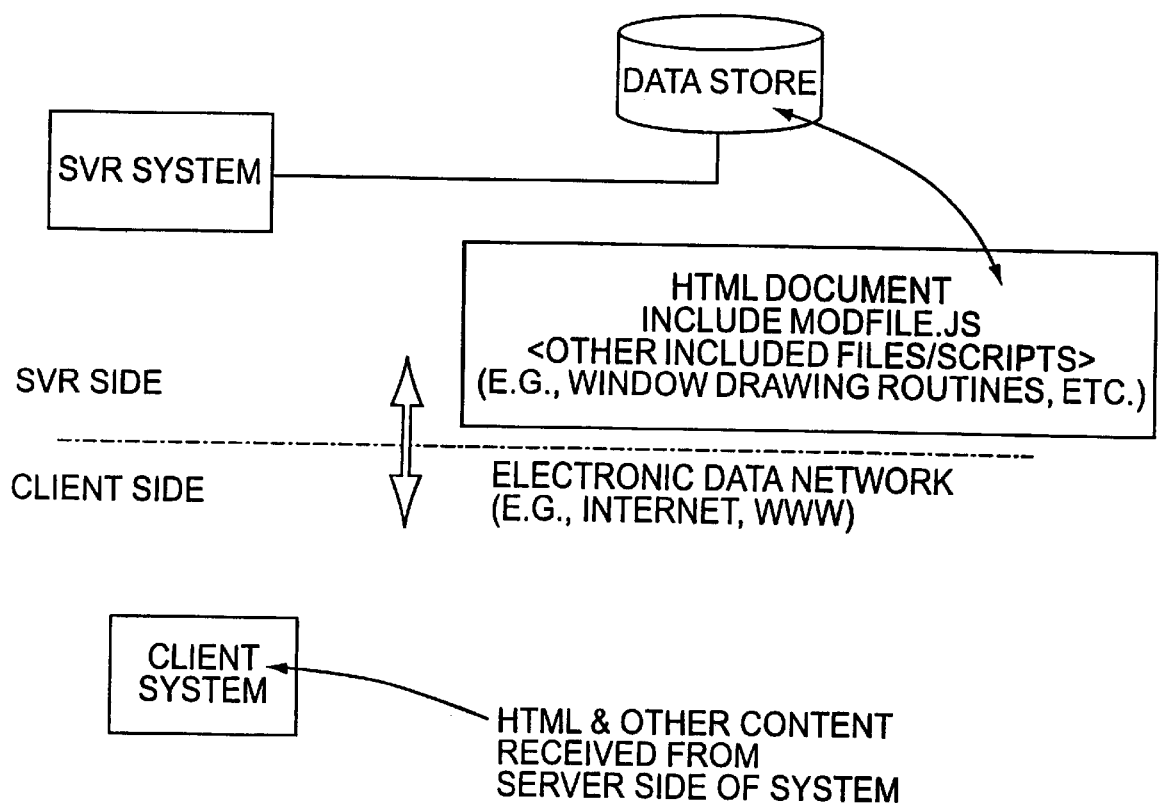
FIG. 1A is a diagram of a system in which a world wide web (WWW) browser client will realize a windows based content manifestation environment in accordance with a preferred embodiment of the present invention.

The present invention is now discussed in detail with reference to the drawing figures that were briefly described above. Unless otherwise specified, like parts, systems, and processes are referred to with like reference numerals.

Glossary

The following terms are used within the instant patent document to illustrate and define the novel features of the present invention. Accordingly, reference should be had to this Glossary for definitions of terms that are used to provide enabling disclosure related to the present invention's systems and methods for facilitating a windows based content manifestation environment within a WWW browser.

The terms that are capitalized below bear the following meanings.

Content is any form of digital data stream that may be supplied or sent to a computing system such as a personal computer.

The WWW is the world wide web and its associated protocols and related technologies which may be accessed via the Internet.

A WWW browser client is a software application that is operative to receive and process content to produce a corresponding output (e.g., to manifest text and images within a browser window displayed on a monitor device, etc.).

An Electronic Data Network is any type of network environment from which at least one coupled computer or computing system is configured to receive content such as HTML and related WWW content and to process the same to produce an appropriate output. An exemplary electronic data network is the Internet along with the WWW.

A window object is a Module or a Layer.

A Layer is a WWW browser content display section produced within a content manifestation environment (CME) including, but not limited to, any object within an HTML document that may be scaled, dragged, or otherwise operated upon such as an IMG object, a SPAN object, a DIV object, a form element, etc. and which may be associated with program logic such as within a script, etc. A layer has its own properties including, but not limited to, a name, etc. within an HTML rendition model such as those defined by DHTML standards. Additionally, a layer acts independently of other content within a particular HTML document.

A CME is a controllable WWW browser content display window provided by a WWW browser. For example, a CME is viewed as a dynamic window in which WWW content is normally displayed.

A Module (also referred to herein as a Window Module) is a layer having (1) a control section, and (2) a related content display section which may be manifested within a CME. A module may be recursively referenced in that a particular module provided in accordance with the present invention may include other modules. In other words, the present invention makes it possible to have window objects within window objects.

A DMOD is a draggable module much like a draggable type window provided within an operating system environment.

A TMOD is a tiled module much like a tiled type window provided within an operating system environment.

A Fixed Screen Region or FSR is an area of a screen environment such as within a CME in which content may flow based on Module operations, Java applet control, etc.

A Fixed Layer or FL is a layer having the same behavior as a FSR.

A Content Manifestation Layer or CML is a pop-up type layer much like a pop-up dialog box that can manifest content based on operations occurring within a Module (e.g., hyper-link traversal and/or occurrence of another event, etc.).

Module Controls or MCs control objects such as objects associated with screen icons that react to events (e.g., mouse clicks, mouse-overs, double-clicks, etc.) and which control attributes of a module (e.g., minimization, maximization, closure, resizing, etc.). The icons associated with such control objects will appear in a control section of a module.

The aforementioned and defined terms may be made plural in the text found below (e.g., "DMODs").

Structural Aspects of the Present Invention

Referring now to FIG. 1A, depicted therein is a system in which a windowed content manifestation environment (CME) may be facilitated in accordance with a preferred embodiment of the present invention. In particular, a system 100 includes a server system 102 such as a web server, an associated data store 104 which may form part of server system 102 and/or be part of a separate data storage facility such as one including multiple disk arrays and the like. Stored within data store 104 are HTML documents and other associated files (discussed in detail below with regard to FIGS. 3, 4, 5A, and 5B). Such files are generated in accordance with the present invention to facilitate a windows based content manifestation environment on or within network clients such as WWW browsers that may be used to download the same and to display content therein. Structures 102, 104, and 106, are maintained at a server side as indicated by the dashed line delineating the server side and the client side parts of system 100.

At a client side (e.g., within a client environment such as within a personal computing system,) a client system 108 is outfitted with appropriate network client software to access an electronic data network (e.g., the Internet and the World Wide Web) to couple to server side system SVR System 102. Accordingly, client system 108 is configured to access and download HTML documents such as HTML documents and other related files 106 which may be generated and stored in data store 104.

It is the HTML documents and the related files as discussed herein which facilitate a windows based content manifestation environment within a client system such as within client system 108.

The connection of client system 108 to server side SVR system 102 including the electronic data network (e.g., the Internet and World Wide Web) will be immediately understood by those skilled in the art. Accordingly, it should be noted that client system 108 may be coupled with SVR system 102 via the electronic data network such as through a dedicated network connection, a dial-up network connection or any other network connection that facilitates the transmission of HTML and other related files in accordance with the present invention. In particular, client system 108 may be coupled to server side server system 102 such as via a dial-up connection through an Internet service provider which facilitates TCP/IP communications, etc.

Alternatively, client system 108 may be operated by loading a local version of a software package provided in accordance with the present invention. Such a software package may include HTML and scripts which are provided in accordance with the present invention (FIG. 4) such as via local media (e.g., CD-ROM, etc.) to facilitate a windows based CME within a WWW browser client and which are configured to cause the WWW browser client to access a network site (e.g., a web site, etc.) to download a windows definition (e.g., a file or set of files that initialize a set of modules that are displayed within a windows based CME). A file which can define and initializes a set of modules (e.g., window modules) within a WWW browser client is shown below with regard to a corresponding discussion of FIG. 4 (e.g., see below for a discussion of the file named module_setup.js).

Figure 1B:
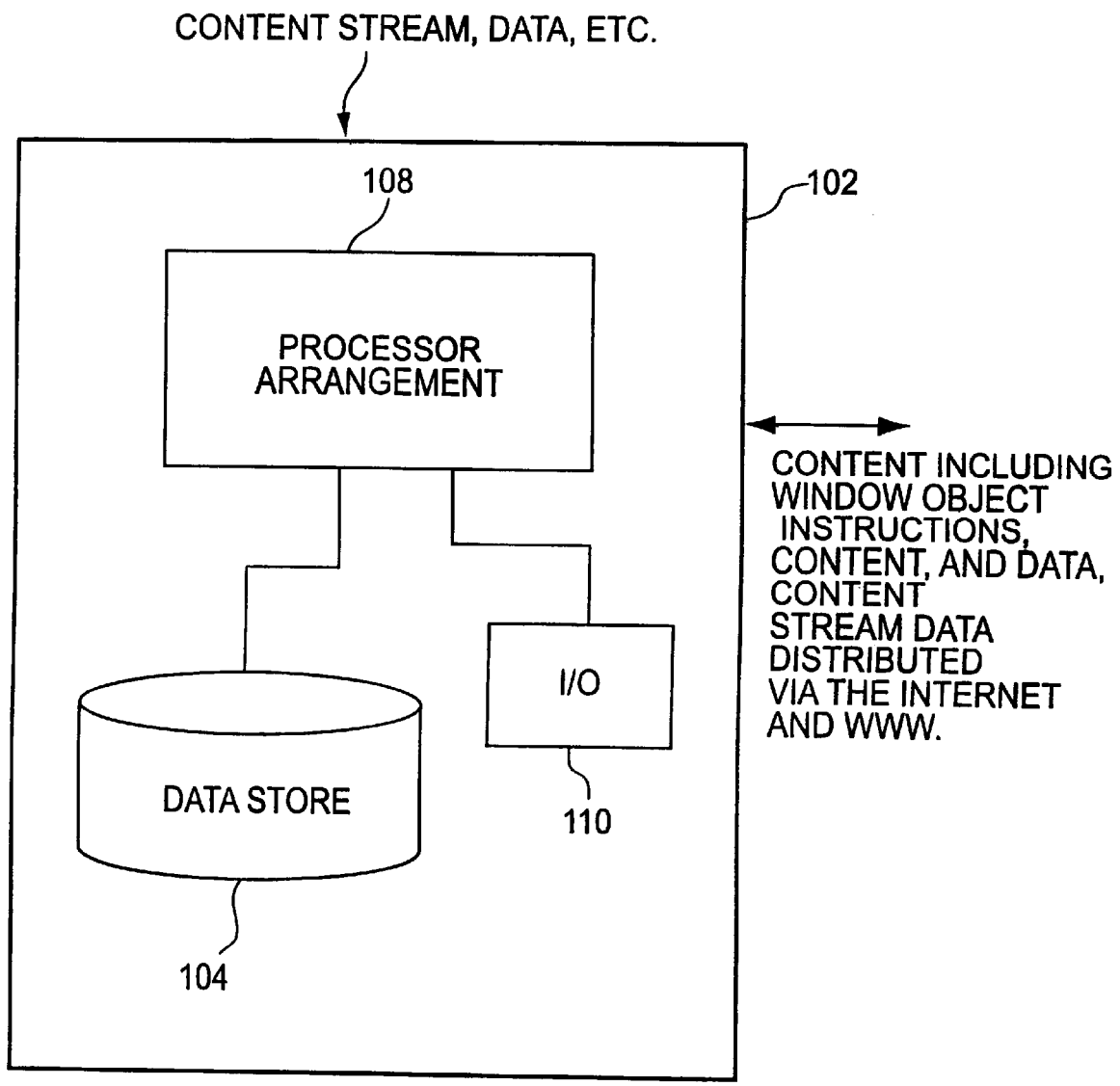
FIG. 1B is a block diagram of a server computing system of the kind that may be used to serve content via the Internet and WWW in accordance with a preferred embodiment of the present invention.

Referring now to FIG. 1B, depicted therein is a block diagram of server system SVR 102 as depicted in FIG. 1. In particular, SVR system 102 includes a processor arrangement 108, data store 104 as an integral component system thereof, and an I/O system 110 which supports network communications. In FIG. 1B, data store 104 is shown as being part of SVR system 102, but the present invention is not so restricted as illustrated in FIG. 1A. SVR system 102 may be implemented using a network server computing system such as one manufactured and marketed by SUN MICROSYSTEMS, INC. (e.g., the SUN SPARC 1000 computing system). Any computing system that facilitates service of web related documents (e.g., HTML documents, javascript files, etc.) via a network connection such as via the Internet and World Wide Web may be used in implementing the present invention.

Content streams and data such as news feeds, stock information, which may be provided by third party providers are input via I/O systems 110 and processed within SVR system 102 to provide web side content to users located on the client side shown within system 100 (FIG. 1A). Accordingly, content including window object instructions, content, data, and content stream data are distributed via an electronic data network such as the Internet and World Wide Web to client system such as client system 108 (FIG. 1A).

Figure 1C:
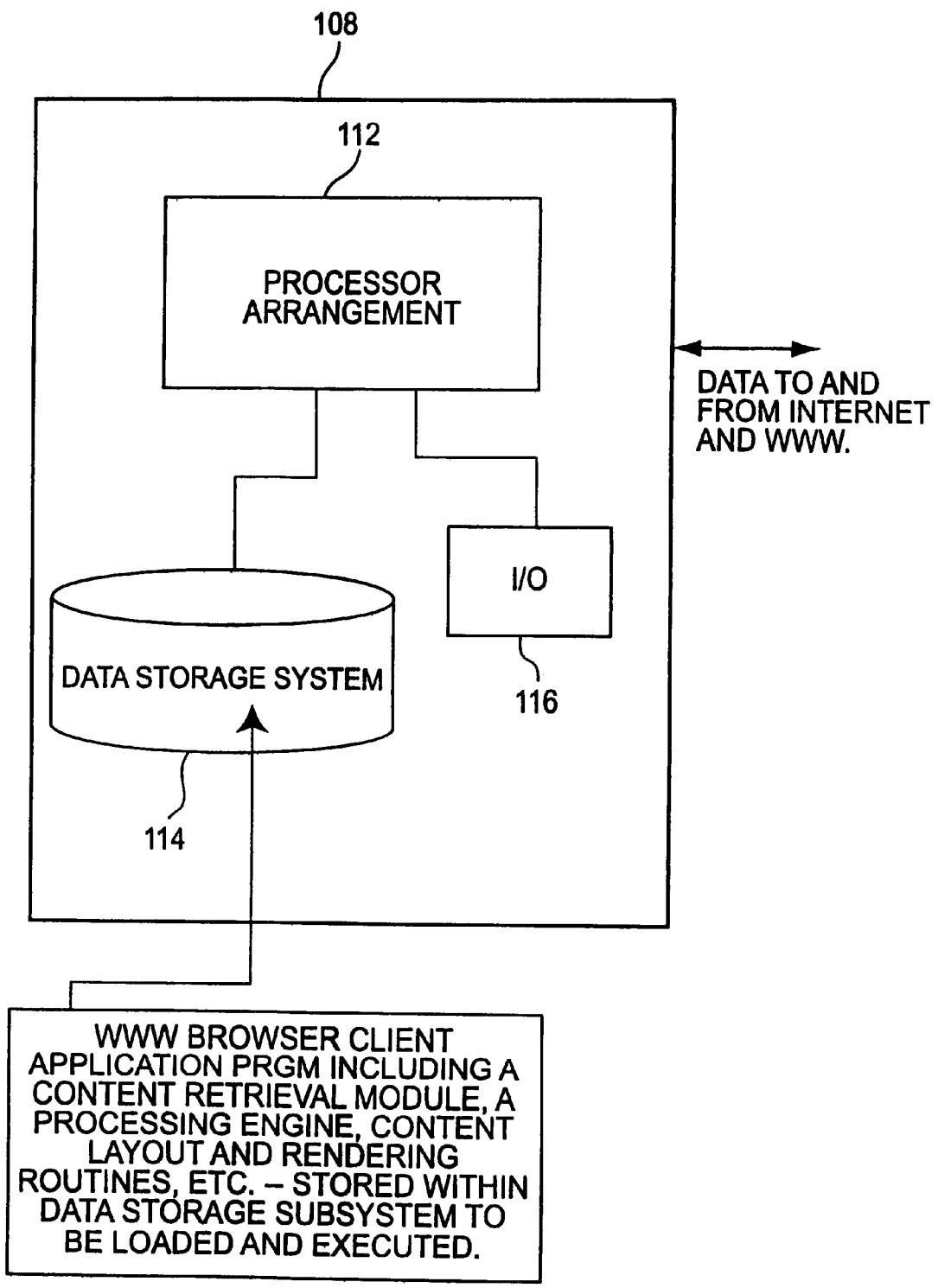
FIG. 1C is a block diagram of a client computing system that can now realize a windows based content manifestation environment provided in accordance with a preferred embodiment of the present invention.

Referring now to FIG. 1C, depicted therein is a block diagram of client system 108 as depicted in FIG. 1. In particular, client system 108 is a personal computing system that has a processor arrangement 112, a data storage sub system 114 such as a local disk array, and I/O facilities 116 such as a modem or other network coupling unit such as an network interface card, etc. Client system 108 is configured to operate in accordance with an operating system such as MICROSOFT WINDOWS 98 which is manufactured and marketed by MICROSOFT CORPORATION and which may be operated in accordance with a network client application such as Internet Explorer version 4.x, Netscape Communicator 4.x, etc. Accordingly, content retrieval modules and software routines contained therein which form part of a network client as mentioned above, which may be stored in data storage sub system as part of a network client application program. Accordingly, a processing engine of such a network client application will also be stored in data storage subsystem so that processor arrangement 112 may retrieve the same and process accordingly.

Data and content which is sent to and received from the Internet and World Wide Web such as from SVR system 102 (FIG. 1B) may be processed through I/O system 116 in a conventional manner.

Figure 1D:
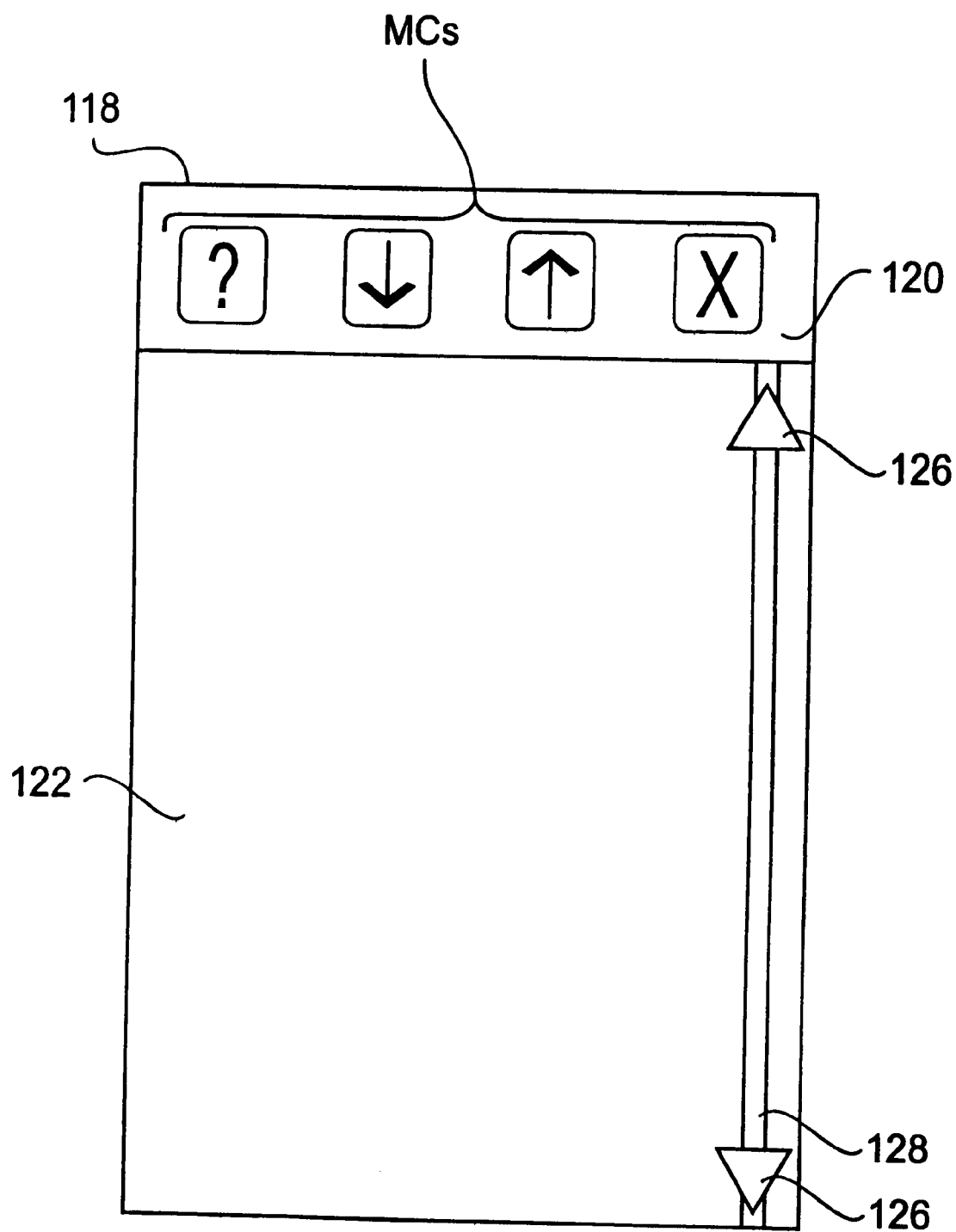
FIG. 1D is diagram of a window module provided in accordance with a preferred embodiment of the present invention.

Referring now to FIG. 1D, depicted therein is a diagram of a window module provided in accordance with a preferred embodiment of the present invention. In particular, window module or module 118 includes a control section 120 and a contend display section 122. Module 118 may be either a DMOD or a TMOD depending on particular design parameters. Preferably, however, module 118 is a DMOD to act like any other window such as those within a windows based operating system desktop environment.

Within control section 120, MCs 124 are included to allow a user to cause associated events to occur. For example, MCs 124 include objects and associated icons to allow a user to receive help (i.e., such as through the "?" icon), to minimize module 118 (i.e., via the down-arrow icon) much like windows are minimized within a windows based operating system, to maximize module 118 (i.e., via the up-arrow icon) much like windows are maximized within a windows based operating system, and to close module 118 via the "X" icon much like windows are closed within a windows based operating system.

The operation of any of the MCs 124 shown within control section 120 need not have a global effect on the entirety of the CME in which module 118 is displayed. That is, there is no requirement that operation of any of the MCs 124 will cause a screen refresh within a WWW browser CME. Such screen refreshes were common in prior web environments as an entire WWW browser CME (or at least a framed section thereof) was refreshed (re-loaded with content, etc.) each time a user selected or operated a link (e.g., a hyper-text link provided by a search engine to retrieve additional content such as "10-more links").

Content such as that received via an electronic data network, from a local hard disk, etc., may be displayed within content display section 122 of module 118. Accordingly, any type of content may be manifested within module 118. For example, static content like or similar to straight HTML content (e.g., text, graphics, etc.) may be manifested, while dynamic content such as from a content feed (e.g., a news fee, a stock ticker feed, etc.) may also be displayed and/or manifested. Accordingly, module 118 may act as a mini-CME within a WWW browser client CME and, in particular, much like a conventional window within a windows based operating system. Because module 118 may be a DMOD, a user may now freely move content display/ manifestation windows within his browser's CME much like he does with program windows when viewing an operating system desktop environment (e.g., the WINDOWS 98™ desktop environment).

To facilitate easy display of content within content display section 122 of module 118, scroll controls 126 may be shown within a scroll bar 128. Scrolls controls 126 are provided when content extends beyond the vertical size of content display section 122 and may be used in a conventional manner. For example, scroll controls like or similar to scroll bars may be implemented using constructs within a WWW browser client such as in MICROSOFT™ INTERNET EXPLORER™ (IE™) V4.x. That is, IE V.4.x supports an "overflow:auto" CSS (cascading style sheet) property which applies to facilitate scroll bars, etc. in the context of the present invention to allow management of content that extends beyond a bottom edge of a visible area of a selected module.

In the context of the present invention and, in particular, with specific regard to FIG. 1D, manifestation of content is a broader concept than simple screen display; to the contrary, manifestation includes the causation of output generation that may start with operations within content display section 122 of module 118. For example, a hyperlink may be displayed within content display section 122 to invite a user click to cause sound to be manifested, etc.

Furthermore, because content display section 122 may dynamically display content such as from a feed or stream, users can now be presented with dynamic windows without having to traverse additional hypertext links, etc. And, since no user intervention is required to dynamically display/manifest content within content display section 122 a browser's CME becomes a dynamic and content-rich environment completely different from currently available static browsers. In essence, modules provided in accordance with the present invention and those similar to module 118 create a new WWW browser client application program that facilitates a novel, content-rich web experience.

The programming constructs and algorithms to achieve the functionality provided by module 118 within the context of the present invention are described in detail below with regard to FIGS. 3, 4, 5A, and 5B.

Figure 2A:
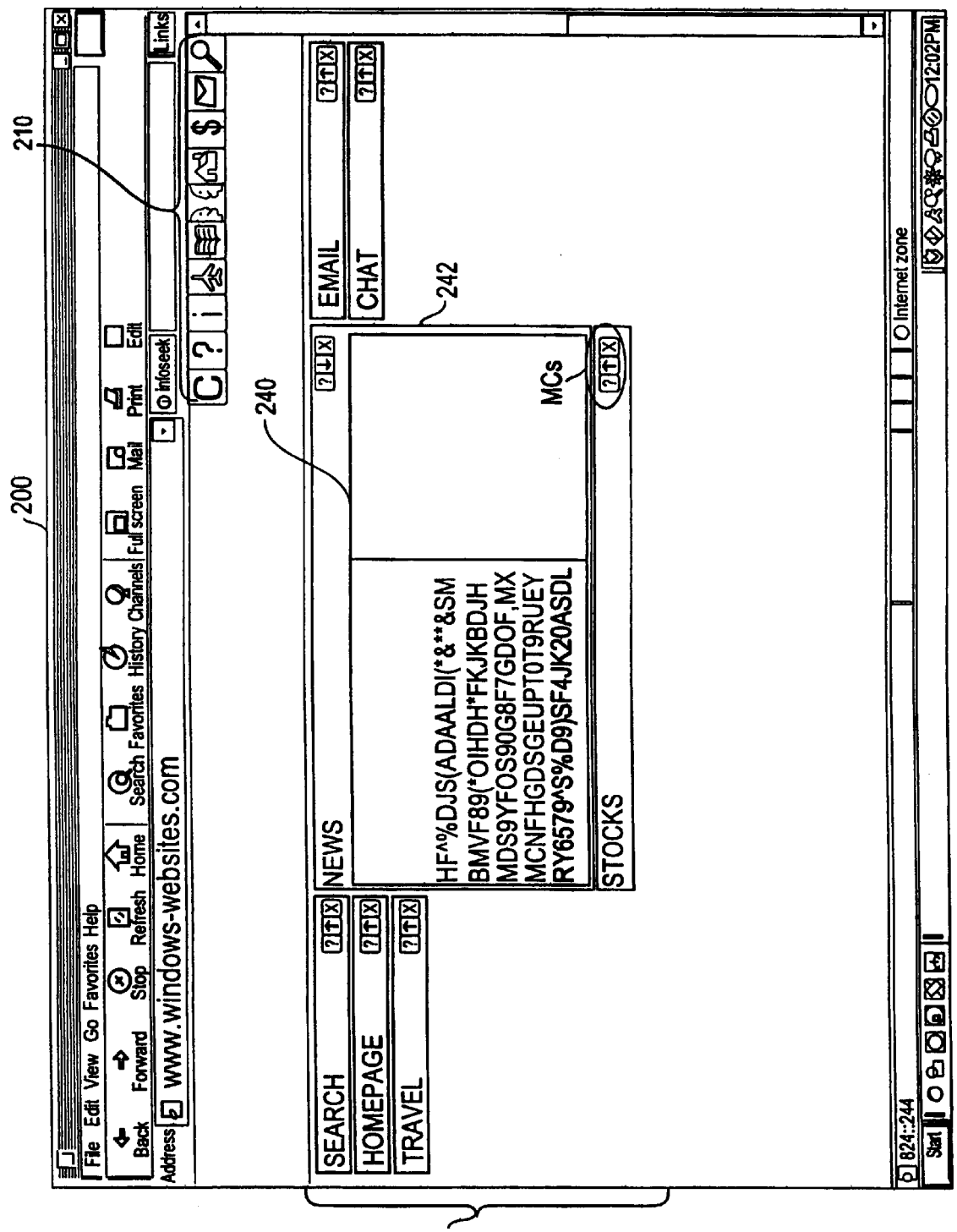
FIG. 2A is screen image that depicts a window based content manifestation environment and, in particular, one that facilitates content manifestation within tiled window objects according to a preferred embodiment of the present invention.

Referring now to FIG. 2A, depicted therein is a screen image of a content manifestation environment (CME) that has been configured to manifest content within tiled window objects in accordance with a preferred embodiment of the present invention. In particular, screen image 200 is that of a WWW browser client screen and, in particular, the CME thereof. Screen image 200 includes a set of TMOD type window modules 202 arranged in table fashion. A set of web site (environment) controls 210 are provided to control the appearance and operation of a web site provided in accordance with the present invention (e.g., the web site with URL www.windows-website.com). Each window module 202 includes a control section 240 and a content display section 242 which may either be minimized or maximized in accordance with the present preferred embodiment and as was described above with regard to FIG. 1D.

Each control section of a particular window module 202, includes module control icons (MCs) which correspond to associated control logic for providing help, window minimization, window maximization, window cancellation or closure, etc. The programs and logic necessary to build the objects and structures shown with in screen image 200 are illustrated with regard to the flowchart shown in FIG. 4, which is described below. The number and nature of MCs is not limited to those shown in screen image 200. To the contrary, any number of module controls (MCs) and related functions may be included within the present invention to facilitate any type of desired window control operation such as those shown in FIG. 1D. For example, the present invention also contemplates the implementation of further specialized controls such as quick content delivery, content source changes, etc. In such cases, appropriate icons may be developed and included within a particular module's control section 240.

Figure 2B:
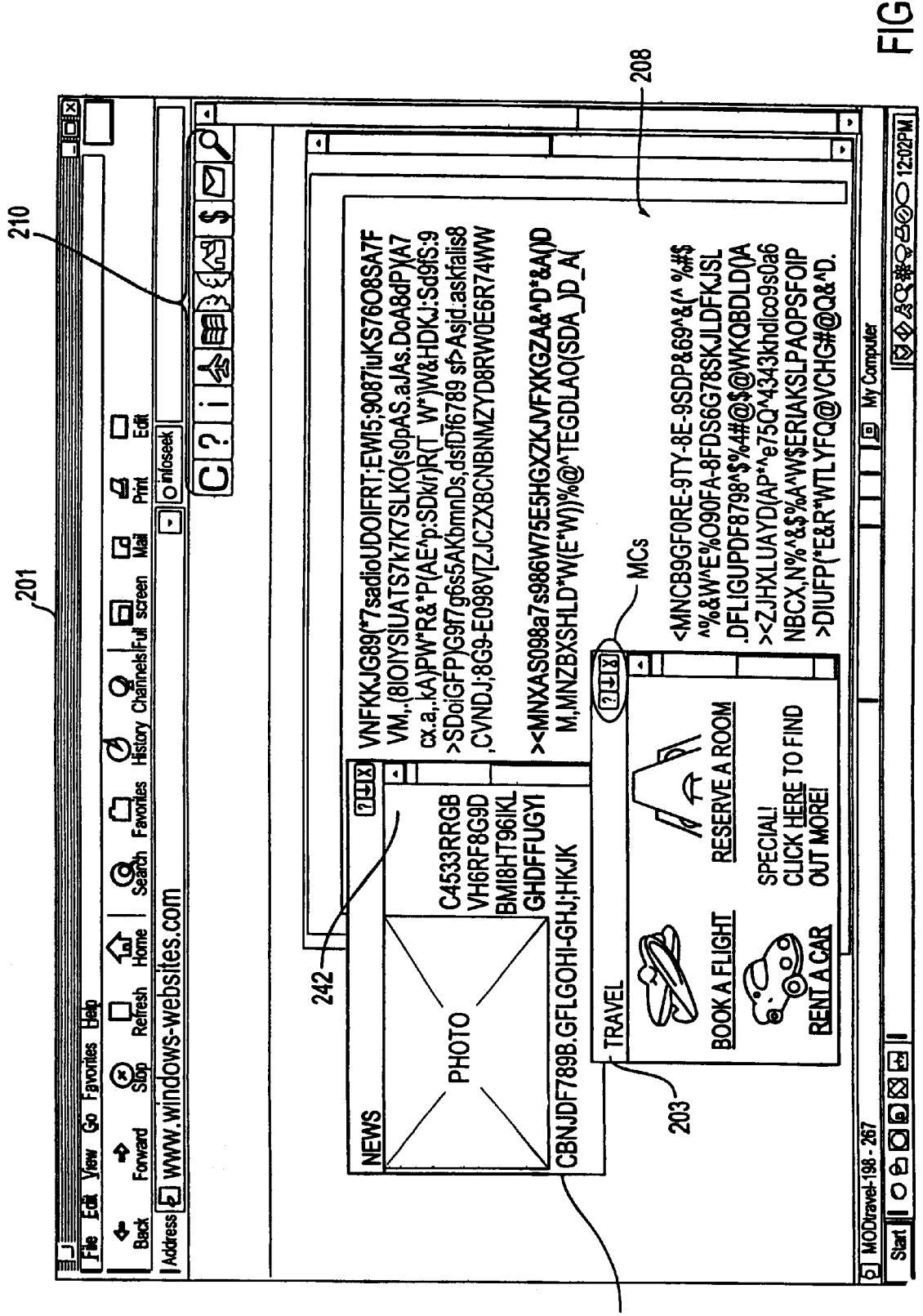
FIG. 2B is a screen image that depicts a windows based content manifestation environment and, in particular, one that facilitates content manifestation within draggable window objects according to a preferred embodiment of the present invention.

Referring now to FIG. 2B, depicted therein is another screen image of a WWW browser client CME which has been configured via the present invention to provide a windows based content manifestation environment in which DMOD type window modules may be freely moved within the same. In particular, the windows based content manifestation environment shown in screen image 201 includes a DMOD 203 (e.g., a travel related content window), a DMOD 204 (a dynamic news feed display window), a content display layer 208 (e.g., a FL, a CML, etc.), and a set of web site controls 210 (e.g., navigation buttons) which correspond to particular code functions which may control the manifestation of content (including window modules) within the CME maintained by a WWW browser in accordance with the preferred embodiment of the present invention.

In FIG. 2B, content display layer 208 may be a FL, FSR, or CML. In any case, content display layer 208 may be provided to manifest content not destined for manifestation within a particular module. In particular, if an FL or FSR is used, a static, always visible window may be positioned within a WWW browser CME for content display. Alternatively, if a CML is used, the same may be provided to pop-up (much like a dialog box pops up in an operating system screen environment when an error condition is realized) whenever content not destined for manifestation within a particular window module is to be presented. When a CML is used, the same may be draggable, etc. within a WWW browser CME much like a DMOD. In any case, a FL, FSR, or CML may be used to facilitate manifestation of content that would otherwise not be destined for window module manifestation. For example, content display layer 208 is manifesting text type content that may be displayed as a result of a hyper link traversal that occurred within DMOD 203.

As shown in FIGS. 2A and 2B, each module (whether tiled or draggable in accordance with the present invention) includes a control section 240 and a content display section 242. The remaining structural aspects of the modules shown in FIG. 2B are the same as those shown in FIG. 2A, and therefore a detailed description is omitted for purposes of brevity.

Figure 3:
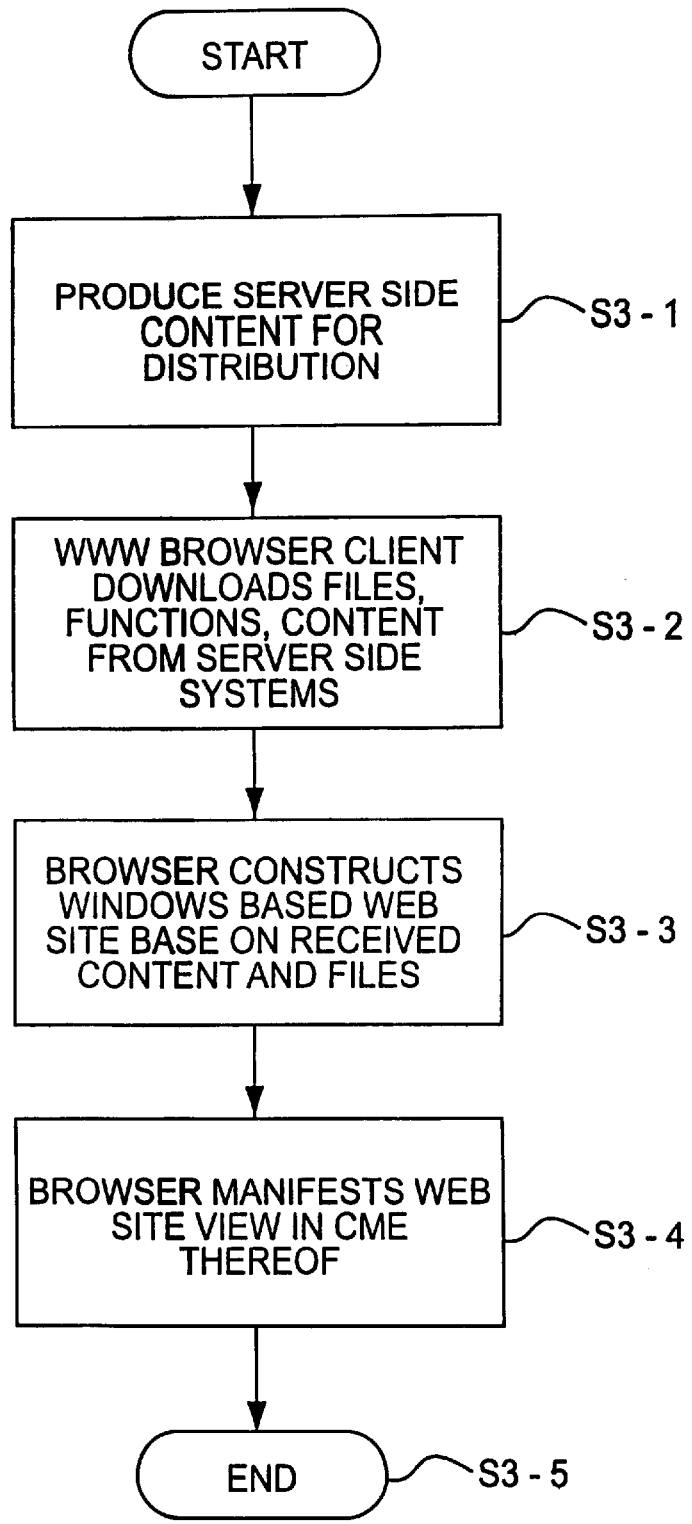
FIG. 3 is a flowchart that generally depicts the process steps that are carried out to facilitate a windowed content manifestation environment within a WWW browser client according to a preferred embodiment of the present invention.

Creation and Operation of a Windowed Content Manifestation Environment Within a Web Browser Operational Aspects of the Present Invention Referring now to FIG. 3, depicted therein is a general process flow chart that illustrates the operations performed and/or related to the structures described above with regard to FIGS. 1A–2B to generate content and related programs to facilitate a windows based content manifestation environment (CME) and the downloading of the same to a network client such as a WWW browser client. The WWW browser client will manifest a CME that facilitates window module functionality according to the present invention. In particular, processing starts at step S3-1 where server side personnel and systems are used to generate and produce server side content including HTML and related files (e.g., javascript files, etc.) and which store the same on server side data storage facilities for distribution via an electronic data network such as the Internet and World Wide Web.

Next, at step S3-2, a WWW browser client loads all files and functions and content stored with in server side systems after requesting the same via an electronic data network.

Next, a WWW browser constructs a web site view within a CME thereof based on the received content, HTML, and other related files (e.g., javascript files, etc.). In particular, the received content, HTML, and other related files instruct the WWW browser client to manifest a windows based CME therein.

At step S3-4, the WWW browser client will manifest the web site view in its CME to allow a user to operate upon received content within a windows based environment much like a windowed environment or shell of an operating system (e.g., much like the WINDOWS 95, 98, NT, UNIX X-WINDOWS environment—WINDOWS, 95, 98, and NT are trademarks of and which may be registered to MICROSOFT CORPORATION, UNIX is a trademark of AT&T CORPORATION).

Processing ends at step S3-5.

Figure 4:
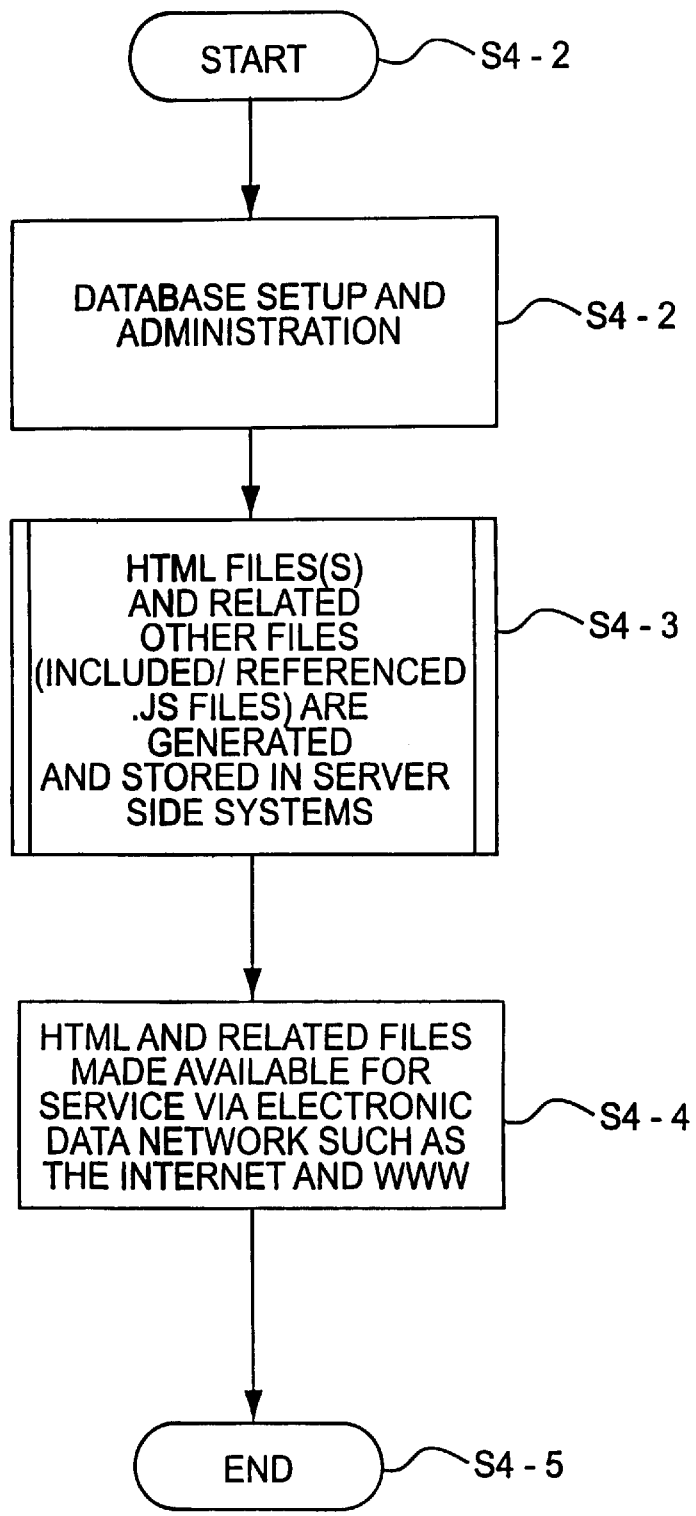
FIG. 4 is a flowchart that illustrates the operations performed within the system depicted in FIG. 1 to facilitate generation and storage of files within the server system depicted in FIG. 1 to enable a windowed content manifestation environment to be generated within a WWW browser client according to a preferred embodiment of the present invention.
Figure 5A:
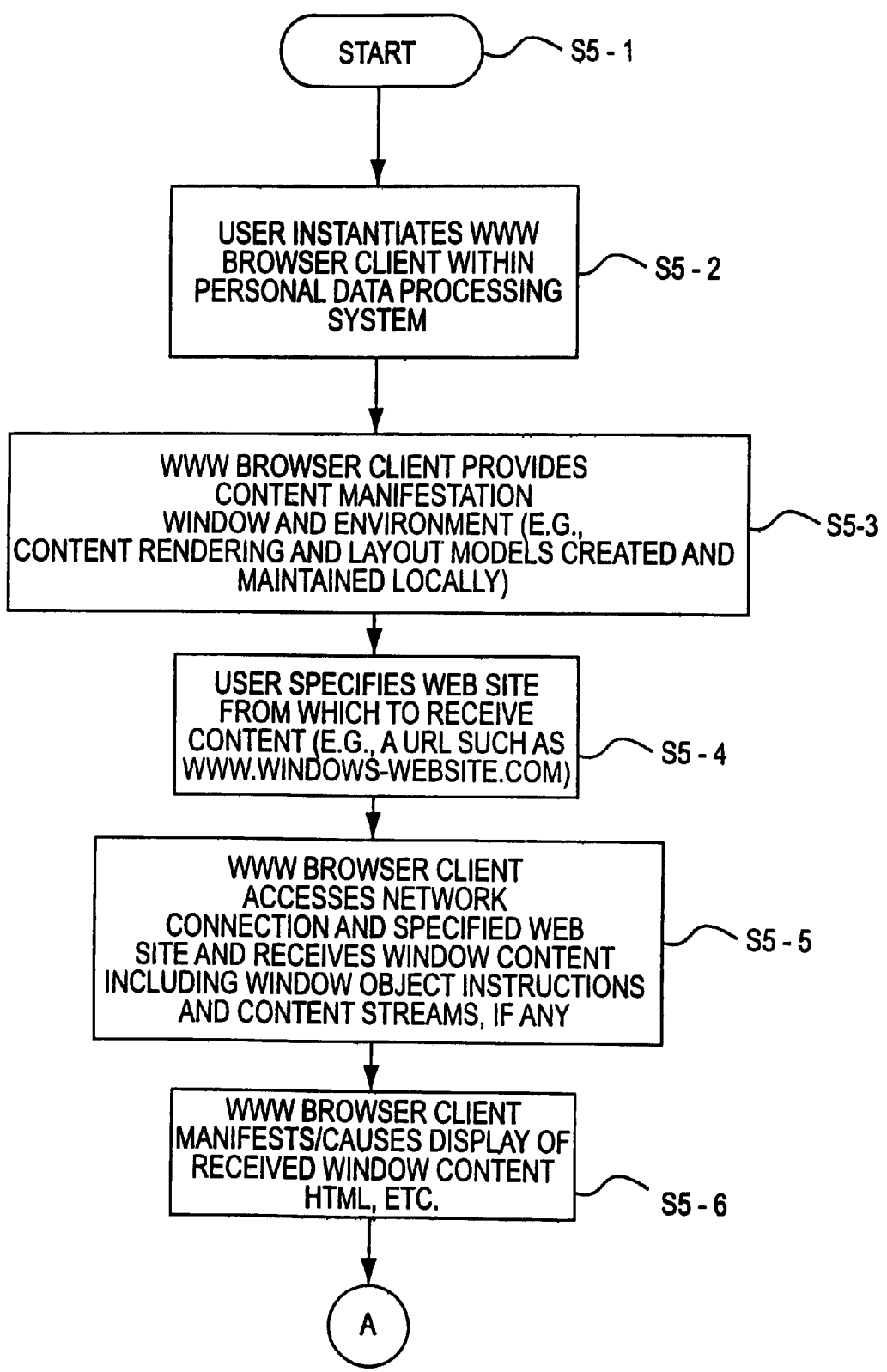
FIG. 5A is a flowchart that illustrates content delivery and processing operations that are performed within the system depicted in FIG. 1 to facilitate a windowed content manifestation environment within a WWW browser client according to a preferred embodiment of the present invention.
Figure 5B:
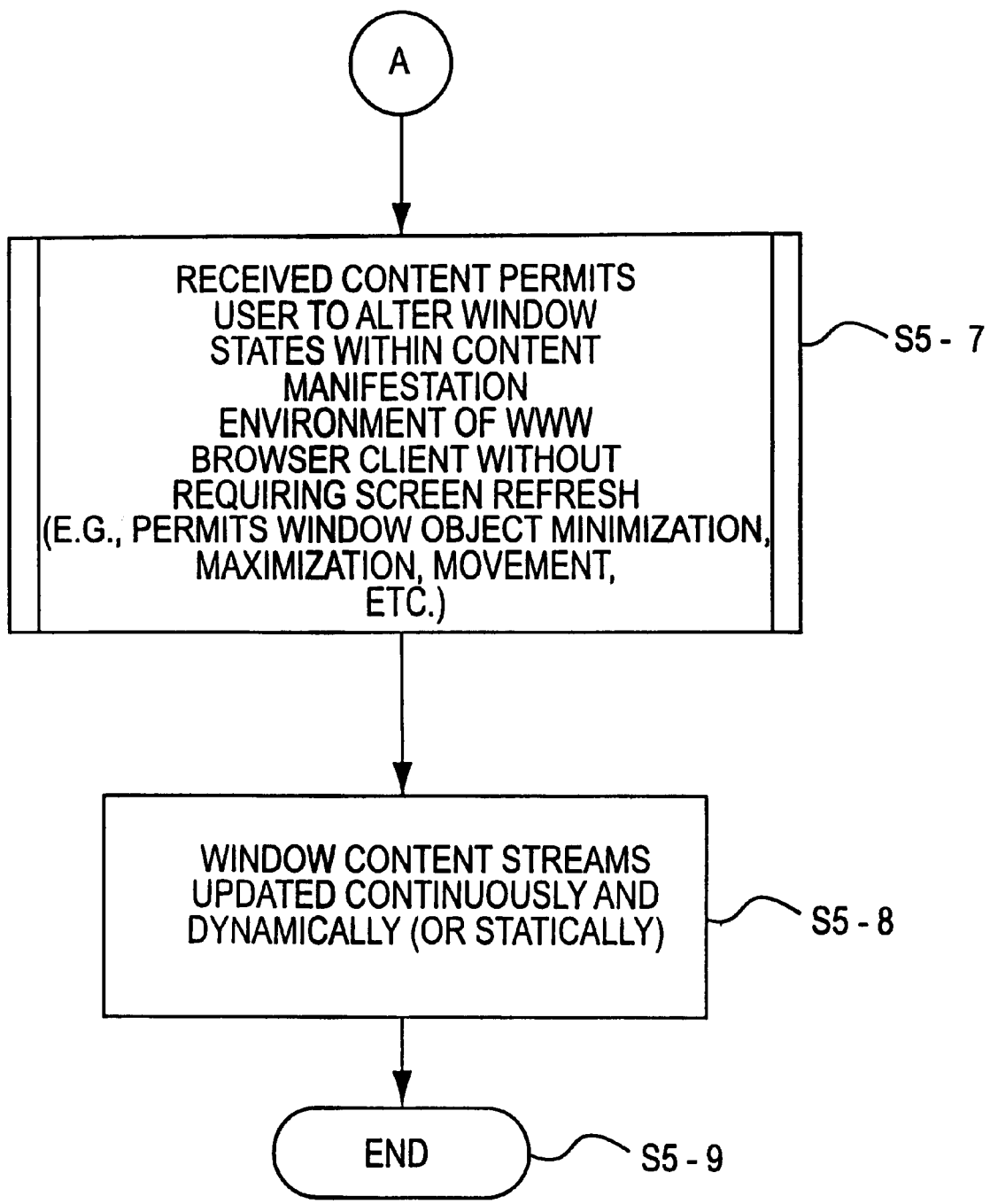
FIG. 5B is the conclusion flowchart to the flowchart started in FIG. 5A.

The general process flow described above in regard to FIG. 3, is now described in further detail by specifically illustrating the aforementioned process steps with reference to FIGS. 4, 5A, and 5B.

In particular, FIG. 4 depicts flowchart that illustrates a process for defining and storing a software package to be served to clients to realize windows based CMEs therein in accordance with the present invention. In particular, processing starts at step S4-1 and immediately proceeds to step S4-2.

At step S4-2, database setup and administrative operations are carried out to produce appropriate database structures at an appropriate server side system such as at server SVR system 102. Preferably, an administrator will create an SQL (structured query language) type database table such as by using MYSQL V.4.0. Such a database table stores data about respective window modules. The following script may be used to generate, output, and initialize such a database structure. Those skilled in the art will immediately understand the following code script. In particular, the SQL instructions listed below place data into the generated table to correspond to window modules that will ultimately form the basis of respective windows to be provided and visually displayed within a CME in accordance with the present invention. The fields/columns defined within the table are self-explanatory and do warrant further discussion here. For example, the column "Xposition" defines a screen position for a window module to be drawn within a CME.

```
# MySQL dump 4.0

# Host: localhost Database: ENVIRONMENT
#---------------------------------------------
# Table structure for table 'MODULES'

CREATE TABLE MODULES (
    Priority tinyint(2),
    Name varchar(20) DEFAULT "NOT NULL,
    Open tinyint(1) DEFAULT '0',
    Maximized tinyint(1) DEFAULT '0',
    Xposition tinyint(1) DEFAULT '0',
    Yposition tinyint(1) DEFAULT '0',
    Height smallint(4),
    Width smallint(4),
    PRIMARY KEY (Name)
);
# Dumping data for table 'MODULES'
INSERT INTO MODULES VALUES (2,'MODchat',1,1,0,0,0,0);
INSERT INTO MODULES VALUES (1,'MODnews',1,1,0,0,0,0);
INSERT INTO MODULES VALUES (3,'MODhomepage',1,1,0,0,0,0);
INSERT INTO MODULES VALUES (0,'MODtravel',1,1,0,0,0,0);
INSERT INTO MODULES VALUES (4,'MODstocks',1,1,0,0,0,0);
INSERT INTO MODULES VALUES (5,'MODemail',1,1,0,0,0,0);
INSERT INTO MODULES VALUES (6,'MODsearch',1,1,0,0,0,0);
```

The above-listed "INSERT" statements are used to fill the generated database with window module names, etc. to form the basis of an initial set of-windows that are ultimately displayed in a windowed CME in accordance with the present invention.

Next, processing proceeds to step S4-3. At step S4-3, HTML files and related files (e.g., included and referenced javascript files, etc.) are generated and stored within server side data storage facility (e.g., data store 104—FIG. 1). Exemplary programs to carry such operations are provided immediately below:

For example, the following script may be generated within a software development environment known as PHP3 (Personal Home Page V.3.0) which is a freeware software package under constant development which may be used to create an HTML-based graphical user interface (GUI) database administration utility which may be used within a server-side WWW browser client to facilitate window module attribute setting and adjustment and corresponding database operations. Such attributes correspond to column values stored within the database table illustrated and described above. Accordingly, after using PHP3, the following HTML script language may be loaded into a WWW browser client to permit user adjustment of window module attributes (e.g., vertical and horizontal CME positions, priority, position, etc.). Those familiar with HTML will immediately understand the following markup instructions.

```
<html><head><title></title>
<script language="Javascript">
var MO = new Array( );
var STORED = new Array( );
var thisKey = ' ';
// handles form submission
function submitForm(thisName)
```

-continued

```
        {
                var PRIORITYSTRING = ' ';
                        var modName = ' ';
                        // go through all modules and grab the priority value; build it
                        // into a string and send it to that form's PRIORITYSTRING hidden field.
                        for(x=0; x <= highPriority; x++)
                                {
                                        modName = MO[x];
                                        PRIORITYSTRING += (modName + '=' +
document.forms[modName].priority.value.toString( ));
                                        if(x != highPriority) {PRIORITYSTRING += '~~';}
                                }
                        // update the hidden PRIORITYSTRING value
                                document.forms[thisName].PRIORITYSTRING.value = PRIORITYSTRING;
                                        // submit the form
                                document.forms[thisName].submit( );
        }
function storeValue(thisValue,thisForm,thisItem)
        {
                // store the value in any window that gets focus;
                // used to replace bad entries or switch priorities
                thisKey = (thisForm + thisItem);
                STORED[thisKey] = thisValue;
                        return;
        }
function checkInput(thisValue,thisForm,thisItem)
        {
                // check that object flags are either '1' or '0'
                        // if an error, inform and replace with old value and return
                if(((thisValue != '0') && (thisValue != '1')) || (thisValue.length > 1))
                        {
                                // alert the error and replace original value
                                alert('The only acceptable values are "1" or "0" ');
                                thisKey = (thisForm + thisItem);
                                document[thisForm] [thisItem].value = STORED [thisKey];
                                        return;
                        }
        }
function checkPriority(thisValue,thisPosition)
        {
                /*
                        * this will first check if the number is in range (0-highPriority)
                        * or if it is an invalid string--if either, inform of error and reset old
value;
                        *
                        * if value is ok, search through all the priority fields and find the field
                        * that contains the value current field is being set to, and set THAT field
                        * to the stored value for the current field (ie. switch the values)
                        */
                thisValue -= 0; // turn it into a number
                        thisKey = (MO[thisPosition] + 'priority');
                        // check value and alert if error
                        if((thisValue < 0) || (thisValue > highPriority) || (parseInt(thisValue) !=
thisValue))
                                {
                        alert('That value is out of range, or contains illegal characters.\nPlease enter a
numeric value between 0 and ' + highPriority + '.');
                                        document[MO[thisPosition]].priority.value = STORED[thisKey];
                                }
                                else // go through and find value matching current, and switch them
                                        {
                                for(x=0; x <= highPriority; x++)
                                                {
                                                        if(x == thisPosition) {continue;} // skip current value
                                                                if(document[MO[x]].priority.value == thisValue)
                                                                        {
                                                                                // if a match is found, switch the values and exit
                                                                                document[MO[x]].priority.value = STORED[thisKey];
                                                                                        break;
                                                                        }
                                                }
                                        // lose any whitespace, prepended zeros
                                        thisValue = parseInt(thisValue);
                                                // realize the corrected value
                                                document[MO[thisPosition]].priority.value = thisValue;
                                        }
                                        return;
        }
</script>
```

-continued

```
</head>
<body>
<center>
<table cellpadding=4 cellspacing=0 border=1 width=700>
<tr><td>
<font face="verdana,arial,helvetica" size=2><b>
The following is all information relating to module objects. Change the order they appear
in simply by changing the priority number. A change in one number will automatically
switch the rest of the list to accomodate--Ie. if I switch '1' to '2', the item with
priority '2' will now be switched to '1'.
<p>Use only ones(1) or zeros(0) in the property values.<p>
CHANGING THESE VALUES WILL CHANGE THE DATABASE IMMEDIATELY, BUT THE NEW VALUES WILL ONLY
SHOW UP IN THE ACTUAL SITE LAYOUT AFTER THE NEW generated_files/module_setup.js FILE
IS GENERATED. <font color=#ff0000>IT WILL NOT IMMEDIATELY CHANGE THE LAYOUT</font>.
</b></font>
</td></tr></table>
<br>
<?php
include("/usr/www/htdocs/shared/shared.php3");
$FONT_SET = "<font face=\"verdana,arial,helvetica\" size=2>\n";
$JSCRIPT = "<script language=\"Javascript\">";
// get all module data and order it by priority
$MOD_QUERY = dbase_long("ENVIRONMENT","select * from MODULES order by 'Priority' ASC");
$FIELD_NAMES = mysql_list_fields("ENVIRONMENT","MODULES"); // the field names result index
$NUMBER_FIELDS = mysql_num_fields($FIELD_NAMES); // how many fields(PROPERTIES)
$MODULE_COUNT = 0; // counter to keep track of form position
while($currentModule = mysql_fetch_array($MOD_QUERY)) // go through the current module
data
    {
        // get current module name
        $thisName = $currentModule["Name"];
            $thisPriority = $currentModule["Priority"];
            echo"<form name=\" ".$thisName."\"action=\"write_module_changes.php3\"
method=\"post\">";
            // stores priority string on submit
            echo"<input type=\"hidden\" name=\"PRIORITYSTRING\" value=\"\">";
            // stores the module name that data should be attributed to
            echo"<input type=\"hidden\" name=\"sentModule\" value=\" ".$thisName."\">\n";
        echo"<table cellpadding=6 cellspacing=0 border=1><tr><td valign=top
bgcolor=#f0f0f0>\n";
            echo $FONT_SET;
        echo "<font color=#0000ff>\n";
            echo strToUpper($thisName)."</font><p>";
            echo "Priority: <input type=text size=2 name=\"priority\"
value=\" ".$thisPriority."\"onFocus=\"storeValue(this.value,' ".$thisName." ','priority')\"
onChange=/"checkPriority(this.value,' ".$MODULE_COUNT." ')\"><br>";
            echo "</font></td><td valign=top bgcolor=#d0d0d0>";
            echo $FONT_SET;
            // now go through all fields displaying property names and values;
            // skipping first 4 fields:Priority,Name,Open,Maximized since
            // Priority is already displayed, Name can't be changed, and Open && Maximized
            // are set by environment
            for($thisField = 4; $thisField < $NUMBER_FIELDS; $thisField++)
                {
                    $fieldName = mysql_field_name($FIELD_NAMES,$thisField);
                        $fieldValue = $currentModule[$thisField];
                    // write the properties by name(field) and value (row value for field)
                echo $fieldName.": <input type=text size=5 name=\" ".$fieldName."\"
value=\" ".$fieldValue."\"><br>";
                }
            $MODULE_COUNT++;
                        echo"</td></tr><tr><td colspan=2 bgcolor=#f0f0f0 valign=top
align=center>/n";
                        echo"<input type=\"button\" onClick = \"submitForm(' ".$thisName." ')\"
value=\"UPDATE MODULE\"<br>";
                        echo"</td></tr></form></table>\n\n";
                        echo $JSCRIPT."MO[".($MODULE_COUNT -1)."] = ' ".$thisName." ';.</script>";
    }
                        echo $JSCRIPT."var highPriority = ".($MODULE_COUNT - 1).";<script>";
?>
</center>
</body>
</html>
```

Once a database table is generated to store window module properties and the like, and after the above-listed script is generated and run to allow GUI manipulation of window module attributes stored within the generated database table which is stored at a server side system such as within SVR system 102 (FIG. 1), for example, PHP3 may again be used to automatically generate an output javascript file which forms the basis of a software package that subsequently may be downloaded to network users for processing within their WWW browser clients to facilitate a windows based CME therein in accordance with the present invention. A sample PHP3 script to automate javascript file generation is listed below. Those skilled in the art of web type programming will immediately recognize the nature of the PHP3 script language listed below.

```
/************************************************************
 * generated_files/module_setup.php3                         *
 *
 * This script is used to create all of the window modules which  *
 * will be used by the interface. It is working on the ENVIRONMENT *
 * database, within the table MODULES. It will output all of the   *
 * necessary javascript to store all the module names in MODULE_NAMES, *
 * all module objects in MODULES[mod_0 . . . mod_n], and set all   *
 * the necessary propertiess in each object. In short, this        *
 * generates the .js file (generated_files/module_setup.js) which  *
 * provides layout and content information for all of the modules. *
 ************************************************************/
include("/usr/www/htdocs/shared/shared.php3");
// set the file pointer
$thisFile = fopen ("/usr/www/htdocs/generated_files/module_setup.js","w");
// write the initial setup jscript
$outFile .= "var MODULE_NAMES = new Array( );\n";
$outFile .= "var MODULES = new Array( );\n\n";
// this is the constructor
$outFile .= "function layerObject(name)\n";
$outFile .= "  {\n";
$outFile .= "    this.Name = name;\n";
$outFile .= "  }\n\n";
$MODULE_COUNT = 0; // will increment and use as key for MODULE_NAMES
// get all module data and order it by priority
$MOD_QUERY = dbase_long("ENVIRONMENT","select * from MODULES order by 'Priority' ASC");
$FIELD_NAMES = mysql_list_fields("ENVIRONMENT","MODULES"); // the field names result index
$NUMBER_FIELDS = mysql_num_fields($FIELD_NAMES); // how many fields(PROPERTIES)
// go through the current module data
// write the properties, and fill the Text value
while($currentModule = mysql_fetch_array($MOD_QUERY))
    {
        // get the current module name
        $thisName = $currentModule["Name"];
            // write to MODULE_NAMES
            $outFile .= ("MODULE_NAMES[".$MODULE_COUNT."] = ' ".$thisName." ';\n");
            // write code to create module object
        $outFile .= ("MODULES[' ".$thisName." '] = new layerObject(' ".$thisName." ');\n");
            // now go through all fields and, using those as property names, set
            // object properties for MODULES[n].currentField = currentFieldSetting
        for($thisField = 2; $thisField < $NUMBER_FIELDS; $thisField++)
            {
                // write the properties by name(field) and value (row value for field)
                $outFile .=
("MODULES[' ".$thisName." '].".mysql_field_name($FIELD_NAMES,$thisField)." =
".$currentModule[$thisField].";\n");
            }
                /*
                 * am now going to fill the text field;
                 * to do this, we first read in the html file as a
                 * string; then we simply attribute that string to
                 * the Text property of the current object;
                 * the html files are named the same as the module + .txt
                 * and are in the /HTML directory
                 */
                $HTML = " ";
                $HTMLpath = "/usr/www/htdocs/HTML/";
                $HTML .= $HTMLpath.$thisName.".txt";
                $tt = fopen($HTML,"r");
                $filecontents = fread($tt, filesize($HTML));
                $filecontents = ereg_replace("\n"," ",$filecontents);
                $filecontents = ereg_replace(" ' ","\' ",$filecontents);
                $outFile .= "MODULES[' ".$thisName." '].Text = ' ".$filecontents." ';";
                fclose($tt);
            $MODULE_COUNT++;
        }
// write the total module count (1 higher on base 0)
$outFile .= ("\nvar TOTAL_MODULE_COUNT = ' ".$MODULE_COUNT." ';\n\n");
// now establish any prototype values
$outFile .= "layerObject.prototype.Column = 0;\n";
$outFile .= "layerObject.prototype.Row = 0;\n";
// the file (module_setup.js);
```

-continued

```
fputs($thisFile,$outFile);
$outFile = ' ';
        FCLOSE($THISFILE);
```

The emphasized "include" statement found in the listing/file presented above refers to another script listing/file named "shared.php3." Such a file includes standard library functions used by PHP to generate output files in accordance with the present invention. Shared.php3 is listed below. Those familiar with PHP will immediately understand the functions presented in shared.php3 after carefully reviewing the same.

```
<?php
/*
        -------------------------------------------------------------
        A SHARED FUNCTION LIBRARY FOR PHP3
        -------------------------------------------------------------
        ----------------------
        erroneous (errormsg);
        ----------------------
                requires:    - errormsg ->  a string containing an error message, to be
                                            attached to the string "An error has occurred:"
                                            and sent to an alert dialog box. Be sure to
                                            call this function from inside the <head> or
                                            <body> of the document.
                returns:   echoes the javascript to alert the user of the error, and
                           then resets the browser history to the previous page.
        ------------------------------------
        mail_it([address], [subject], message);
        ------------------------------------
                requires:    - address   ->  a valid email address; if no email address
                                             is specified, mail will be sent to the
                                             administrator, set in $address;
                               subject   ->  an optional subject line. Default = "[none]"
                               message   ->  the body of the message. All messages will
                                             have date and time information attached to
                                             the bottom of the message.
                returns: Nothing.
        ------------------------
        dbase_long(dbase, sqlquery);
        - return the result index of a dbase request
        ------------------------
                requires:    - dbase -> string containing a valid mysql database;
                               sqlquery -> string containing a valid sql request;
                returns: integer ->    the result index of the query, which
                                       can then be "fetched" from as you please.
        ------------------------
        dbase(dbase, sqlquery, [read/write]);
        - read or write to a single field in a specified dbase.
        ------------------------
                requires:    - dbase -> string containing a valid mysql database;
                             - sqlquery ->  string containing a valid
                                            sql request (ie. select name from testtable where id='1');
                             - read/write ->  one of "read" or "write"; if set to "read"
                                              (ie. if your request is a SELECT which returns
                                              some value) the function will return a string
                                              containing that value. If set to "write", function
                                              returns a boolean success/failure flag. If not
                                              set, defaults to "read".
                returns: string ->  either the result on a read, or the success flag
                                    on write. Note that this function returns a single
                                    field value on read. If you are seeking multiple
                                    results, use dbase_long( ). If the request fails,
                                    the function will return "error".
        ------------------------
        get_file(path, [html_flag]);
        - Reads the specified file and returns all
          contents as a string.
        ------------------------
                requires:    - path ->   the full path to the file, including
                                         the file name, ie. "/files/new/my_file.txt";
                             - [html_flag] -> optional flag: if included (ie. set to "html"), all
                                              newlines are replaced with "<br>" html tags.
                returns: string ->  each line (concatenated) of indicated file is returned
                                    as a string.
        */
```

-continued

```
/////////////////////////
// erroneous( ) //
/////////////////////////
function erroneous ($errormsg)
        {
                $errorString = "An error has occurred:";
                echo "<script language=\"Javascript\">\n";
                echo "alert(' ".$errorString.$errormsg." ');\n";
                echo "self.history.go(-1);\n";
                echo "</script>\n";
                exit;
        }
/////////////////////////
// mail_it( ) //
/////////////////////////
function mail_it($address,$subject = "[none]",$message)
        {
                $address = ($address) ? $address:"hhhubris@hotmail.com";
                $message .= "\n-------------------------------------------------------\n".date("M d Y,
h:i:s");
                mail($address,$subject,$message);
        }
/////////////////////////
// dbase_long( ) //
/////////////////////////
function dbase_long($dbase,$sql_query)
        {
                mysql_connect( );
                $this_result = mysql_db_query($dbase,$sql_query);
                return ($this_result);
                mysql_close( );
        }
/////////////////////////
// dbase( ) //
/////////////////////////
function dbase($dbase,$sql_query,$read_write="read")
        {
                mysql_connect( );
                $this_result = mysql_db_query($dbase,$sql_query);
                $return_value = ($read_write == "read") ? @mysql_result($this_result,0,0):
$this_result;
                return (($return_value) ? $return_value:"error");
                mysql_close( );
        }
/////////////////////////
// get_file( ) //
/////////////////////////
function get_file($this_path,$htmled = " "
        {
                if(file_exists($this_path))
                        {
                                $this_file = fopen($this_path,"r");
                                $this_stuff = ltrim(fread($this_file,filesize($this_path)));
                                fclose($this_file);
                                return (($htmled) ? ereg_replace("\n","<br>",$this_stuff):$this_stuff);
                        }
        }
?>
```

As noted above, the output javascript file that forms the basis of a software package and a corresponding windows based CME in accordance with the present invention is generated after executing the instructions listed in the scripts shown immediately above. Such output javascript file (referred to herein as a "javascript file containing window module setup routines") may be downloaded along with other web site source files to client systems and, in particular, to WWW browser clients via an electronic data network such as the Internet and WWW. Alternatively, the other web site source files may be maintained locally within client systems which, at appropriate times, access an electronic data network (e.g., the Internet and WWW, an intranet, or other networking environment, etc.) or local storage devices to receive the javascript file containing window module setup routines. Accordingly, the present invention contemplates the provisioning of a generalized windows based interface within a WWW browser client which may be particularlized based on a single file (e.g., the javascript file containing window module setup routines, etc.) for given computing and data processing environments. That is, the present invention now allows web site developers and operators, for example, to create dynamic content manifestation environments easily and without having to endlessly generate new content delivery interfaces to appear dynamic.

In any case, the output javascript file along with such other web site source files will instruct such a WWW browser client to produce a windowed CME in accordance with the present invention. A sample output javascript file that may be generated and stored on a server (e.g., on SVR system 102—FIG. 1) and downloaded to a WWW browser client is listed below. Those skilled in the art of web programming and, in particular, javascript coding will immediately understand the same.

```
/* WINDOW MODULE SETUP ROUTINES (ESTABLISHES PARAMETERS FOR NEW WINDOWS WITHIN A CME) . . . */
var MODULE_NAMES = new Array( );
var MODULES = new Array( );
function layerObject (name)
        {
                this.Name = name;
        }
MODULE_NAMES[0] = 'MODtravel';
MODULES['MODtravel'] = new layerObject('MODtravel');
MODULES['MODtravel'].Open = 0;
MODULES['MODtravel'].Maximized = 1;
MODULES['MODtravel'].Xposition = 0;
MODULES['MODtravel'].Yposition = 0;
MODULES['MODtravel'].Height = 200;
MODULES['MODtravel'].Width = 400;
MODULES['MODtravel'].Text = '<img src="images/erase1.gif"><img
src="images/erase2.gif"><br>img src="images/erase3.gif" align=left><font
color=#ff0000>SPECIAL!</font><br>Click <a href="#">here</a> to find out more!';
MODULE_NAMES[1] = 'MODnews';
MODULES['MODnews'] = new layerObject('MODnews');
MODULES['MODnews'].Open = 1;
MODULES['MODnews'].Maximized = 1;
MODULES['MODnews'].Xposition = 282;
MODULES['MODnews'].Yposition = 106;
MODULES['MODnews'].Height = 400;
MODULES['MODnews'].Width = 200;
MODULES['MODnews'].Text = '<table cellpadding=0 cellspacing=0 border=0><tr><td
bgcolor=#000000> <object classid="clsid:CFCDAA03-8BE4-11cf-B84B-0020AFBBCCFA"
height="200" id="RealFlash" width="250"> <param name="SRC"
value="rtsp://sound.todayscommunications.com/realtext/news.rt"> <param
name="CONTROLS" value="ImageWindow"> <param name="AUTOSTART" value="-1"> <param
name="NOLABELS" value="0"> </object></td></tr></table>';
MODULE_NAMES[2] = 'MODchat';
MODULES['MODchat'] = new layerObject('MODchat');
MODULES['MODchat'].Open = 1;
MODULES['MODchat'].Maximized = 1;
MODULES['MODchat'].Xposition = 404;
MODULES['MODchat'].Yposition = 377;
MODULES['MODchat'].Height = 200;
MODULES['MODchat'].Width = 200;
MODULES['MODchat'].Text = '<center><form><table cellpadding=6 cellspacing=0 border=1
width=100%><tr><td bgcolor=#d0d0d0 align=right><font size=2
face="verdana,arial,helvetica"><img src="images/username.gif"><br></font></td><td
bgcolor=#d0d0d0><input type="text" size=10 name="uname"><br></td></tr><tr><td
bgcolor=#d0d0d0 align=right><font size=2 face="verdana,arial,helvetica"><img
src="images/password.gif"><br></font></td><td bgcolor=#d0d0d0><input type="text" size=10
name="pword"><br></td></tr><tr><td bgcolor=#333366 colspan=2 align=right><input
type="image" src="images/login.gif"></td></tr></td></tr></table></form></center>';
MODULE_NAMES[3] = 'MODhomepage';
MODULES['MODhomepage'] = new layerObject('MODhomepage');
MODULES['MODhomepage'].Open = 1;
MODULES['MODhomepage'].Maximized = 1;
MODULES['MODhomepage'].Xposition = 10;
MODULES['MODhomepage'].Yposition = 158;
MODULES['MODhomepage'].Height = 200;
MODULES['MODhomepage'].Width = 300;
MODULES['MODhomepage'].Text = 'You\'ve had <font color=#ff0000>237</font> hits on your
page since your last visit!<p>There have <font color=#ff0000>4</font> feedback forms
submitted.<br><img src="ads/sample.gif"><br></center>';
MODULE_NAMES[4] = 'MODstocks';
MODULES['MODstocks'] = new layerObject('MODstocks');
MODULES['MODstocks'].Open = 0;
MODULES['MODstocks'].Maximized = 1;
MODULES['MODstocks'].Xposition = 175;
MODULES['MODstocks'].Yposition = 175;
MODULES['MODstocks'].Height = 200;
MODULES['MODstocks'].Width = 350;
MODULES['MODstocks'].Text = 'Here is the stock information<p> . . . and some more<p> . . . and
some more . . . ';
MODULE_NAMES[5] = 'MODemail';
MODULES['MODemail'] = new layerObject('MODemail';
MODULES['MODemail'].Open = 0;
MODULES['MODemail'].Maximized = 1;
MODULES['MODemail'].Xposition = 127;
MODULES['MODemail'].Yposition = 127;
MODULES['MODemail'].Height = 300;
MODULES['MODemail'].Width = 200;
MODULES['MODemail'].Text = 'this is the email';
MODULE_NAMES[6] = 'MODsearch';
```

-continued

```
MODULES['MODsearch'] = new layerObject('MODsearch');
MODULES['MODsearch'].Open = 0;
MODULES['MODsearch'].Maximized = 1;
MODULES['MODsearch'].Xposition = 7;
MODULES['MODsearch'].Yposition = 127;
MODULES['MODsearch'].Height = 200;
MODULES['MODsearch'].Width = 150;
MODULES['MODsearch'].Text = '<form method=POST><center><font size=4>WWW.WINDOWS-
WEBSITE.COM SEARCH ENGINE</font></center><p><input type=hidden name=altavista value=y>
AltaVista, <input type=hidden name=infoseek value=y> InfoSeek, <input type=hidden
name=webcrawler value=y> WebCrawler, <input type=hidden name=thunder value=y>
ThunderStone, <input type=hidden name=excite value=y> Excite, <input type=hidden
name=lycos value=y> Lycos, <input type=hidden name=yahoo value=y> Yahoo, <input
type=hidden name=look value=y> LookSmart, <input type=hidden name=mining value=y> The
Mining Co., <p><font color=ff0000>Search For</font>:<input type=text width=40
name=text><input type=button name=search value=Search
onClick="top.fetchFile(\'http://pavlov.apollo-ent.com/cgi-bin/nph-
search?search=Search&altavista=y@infoseek=y\');"></form>';
var TOTAL_MODULE_COUNT = '7';
layerObject.prototype.Column = 0;
LAYEROBJECT.PROTOTYPE.ROW = 0;
```

As noted above, the generated javascript file containing window module setup routines may be processed by a WWW browser client along with other related web site source files to produce a windowed web site environment within a CME of the WWW browser client and one into which other content feeds (news feeds, stock fees, etc.) may be manifested.

The above-referenced other related web site source files that are generated and stored within server side data storage facilities are to be configured in accordance with the present invention to reference the window module definitions maintained within the above-described generated javascript file. Exemplary files to facilitate such a windows based content manifestation environment are next described to illustrate their interaction with the above-described javascript file that contains window module setup routines. Those skilled in the art and, in particular, those skilled in web site design and implementation and object oriented programming techniques will readily understand the constructs and functions defined in the following code listings/scripts/files after careful review of the same.

In particular, the following listings relate to files which are described in detail below and which are named:

index.html
interface_main.html
mainnew.html
var_declarations.js
gen_functions.js
preloader.js
nav_buftons.js
module_draw.js
resize.js
pop_functions.js
pops.js
positioning_functions.js
   index.html The following index.html listing/file initially loads a set of referenced objects including other HTML and javascript routines. One such javascript file that is loaded is referred to as "module_setup.js." That file is the generated javascript file that contains window module setup routines.

```
<html><head><title>welcome to WINDOW-WEBSITE.com</title>
<script language="javascript"></script>
<script language="Javascript" src="var_declarations.js"></script>
<script language="Javascript"
src="generated_files/module_setup.js"></script>
<script language="Javascript" src="gen_functions.js"></script>
<script language="Javascript" src="preloader.js"></script>
<script language="Javascript" src="nav_buttons.js"></script>
<script language="Javascript" src="pops.js"></script>
<script language="Javascript" src="module_draw.js"></script>
</head>
<frameset rows="*, 0" framespacing=0 frameborder=0 frameborder="no"
border=0>
    <frame src="interface_main.html" name="MAIN" marginheight=0
marginwidth=0 noresize border=0>
    <frame src="dummy.html" name="DUMMY" marginheight=0 marginwidth=0
border=0 noresize scrolling=no>
</frameset>
</html>
``` interface_main.html

The following interface_main.html listing/file may be included to check WWW browser versions. That is, the following HTML file may be used to check browser compliance with HTML standards associated with version 4 type browsers (e.g., NETSCAPE COMMUNICATOR 4.x, MICROSOFT INTERNET EXPLORER 4.x, etc.).

```
<HTML>
<HEAD>
<TITLE></TITLE>
<script language="Javascript">
self.location.href = (top.IS4) ? 'mainNew.html':'mainOld.html';
</script>
</HEAD>
```

```
<BODY>
</BODY>
</HTML>
``` mainNew.html

The following mainNew.html listing/file causes WWW browser client layout of an initial set of window modules (as defined within module_setup.js—discussed above) within the WWW browser client's CME (i.e., causes display of windows within a browser's screen window, etc.).

```
<HTML>
<HEAD>
<TITLE>welcome to wwww.windows-website.com</TITLE>
<script language="Javascript">if(document.layers) {origWidth=innerWidth;origHeight=innerHeight;onresize=function( ) {if(innerWidth!=origWidth||innerHeight ! =origHeight)location.reload( )}}</script>
<script language="Javascript" src="positioning_functions.js"></script>
<script language="Javascript" src="pop_functions.js"></script>
<script language="Javascript" src="resize.js"></script>
<script language="Javascript" src="d&d.js"></script>
<STYLE TYPE="text/css">
</STYLE>
<STYLE TYPE="text/css">
#output {position:absolute; top:100; width:760; height:1000; visibility:hidden;}
#Eoutput {position:absolute; top:100; width:760; height:500; visibility:hidden;}
#popper {position:absolute; width:96; z-index:101; visibility:hidden;}
</STYLE>
</HEAD>
<BODY bgcolor=#d0d0d0 background="images/simple_back.gif" onLoad="init( )">
<script language="Javascript">
var loaderImage = ('<img src="images/loading.gif"><br>');
with(document)
        {
              if(top.IE4)
                    {
                         writeln('<div ID="loader" STYLE="position:absolute; visibility:hidden; z-index:100">');
                         writeln(loaderImage);
                         writeln('</div>');
                    }
              write('<table cellpadding=2 cellspacing=0 border=0 align=right><tr><td align=right valign=top height=30>');
                         writeln(top.navButtons( ));
                         top.finalNavs = ' ';
                         writeln(top.TABLE_CLOSE_TABLE);
                         writeln(top.makespacer(2,100));
        }
top.drawModulesInTables( );
if(top.IS_DRAGGABLE) {top.setVisibility( );}
document.writeln(top.doPop( ));
top.pops = ' ';
</script>
<span id="output">
<table cellpadding=0 cellspacing=0 border=0 width=760 height=1000><tr><td>
</td></tr></table>
</span>
<iframe id="Eoutput" border=0>
<table cellpadding=0 cellspacing=0 border=0 width=760 height=500><tr><td>
</td></tr></table>
</iframe>
<div align=right>
<a href="#" onClick="top.test('new stuff','MODnews');">here</a><br>
<a href="#" onClick="top.test(top.MODULES['MODnews'].Text,'MODnews');">there</a><br>
</div>
</BODY>
</HTML>
``` var_declarations.js

The following var_delclarations.js listing/file includes general and specific variable and array declarations which when processed by a WWW browser client will establish and initialize variables used throughout the routines, processes, and functions defined in this section of the instant patent document.

```javascript
// set path info here
var DEFAULT_IMAGE_PATH = 'images/'; // path to general image directory
var NAV_BUTTONS_PATH = 'nav_buttons/'; // path to nav button images
var MODULE_IMAGE_PATH = 'module_images/'; // path to ALL module graphics
var POPPER_PATH = 'popper/'; // path to pop-up item graphics
/*
 * general environment variable setup
 *
 */
var NS = (navigator.appName == "Netscape") ? 1:0; // netscape?
var IE = (navigator.appName == "Microsoft Internet Explorer") ? 1:0; // explorer?
var N4 = (document.layers); // netscape 4+ ?
var IE4 = (document.all); // explorer 4+ ?
var IS4 = (N4 || IE4); // 4th gen browser?
var FILEOPEN = 0; // whether file open
var ZINDEX = 0; // set variously throught operations on layers
var SIZEABLE_CLASS = 'SIZEABLE'; // the CLASS name of sizeable images
var MODULE_MIN_X = 200; // the minimum width of a scalable layer
var MODULE_MIN_Y = 36; // the maximum width of a scalable layer
// the following are visiblity settings for netscape and explorer, where
// NV[0] element = netscape hide, NV[1] element = net;
// EV[0] element = netscape show, EV[1] element = explorer show;
// used by showHide( ) in positioning_functions.js;
var NV = new Array('hide','show');
var EV = new Array('hidden','visible');
//linkSet = " "; // this is for navigator to cheat the link 'disappearance' in an object
var SCREEN_VERTICAL_OFFSET = 40; // allowances for vert borders && browser buttons
var SCREEN_HORIZONTAL_OFFSET = 20; // allowances for scroll
var SCREEN_TOP_OFFSET = 100; // pixels taken up by the simple logo, buttons, etc.
var DEFAULT_SCREEN_WIDTH = 800-SCREEN_HORIZONTAL_OFFSET; // if old browser, this is default
var SCREEN_X = (IS4) ? screen.availWidth-SCREEN_HORIZONTAL_OFFSET: DEFAULT_SCREEN_WIDTH;
var SCREEN_Y = (IS4) ? screen.availHeight-SCREEN_VERTICAL_OFFSET: ' ';
var SPACER = 'dummy.gif'; // a transparent 2x2 gif that resides in DEFAULT_IMAGE_PATH
// html tags
var LINEBREAK = '<br>';
var PARAGRAPH = '<p>';
var NEWLINE = '\n';
var TABLE_STANDARD = '<table cellpadding=2 cellspacing=0 border=0 width=100%>';
var TABLE_TR = '<tr>';
var TABLE_TD = '<td valign=top>';
var TABLE_TD_BLACK = '<td bgcolor=#000000 valign=top>';
var TABLE_CLOSE_TR = '</tr>';
var TABLE_CLOSE_TD = '</td>';
var TABLE_CLOSE = '</table>';
var TABLE_CLOSE_TABLE = '</td></tr></table>';
var OPEN_MOD = ' '; // set to module wrapper start tag; set when drawing modules
var CLOSE_MOD = '</SPAN>';
var CLEAR_STATUS = 'status=\'\'; return true;'; // clears status line
var CLEAR_STATUS_FULL = ('onMouseOver="status=\'\'; return true;"
onMouseOut="status=\'\'; return true;"'; // complete commands for status clearing
/************************************
 * standard module layout information  *
 * stuff like info on module buttons,  *
 * cellpadding, how many modules per   *
 * row, etc.                           *
 ************************************/
var IS_DRAGGABLE = 0; // boolean on environment; 0=not draggable
// the number of modules per row;
// note how a width of less than DEFAULT_SCREEN_WIDTH will only get 2 rows
var MODULES_PER_ROW = (SCREEN_X < DEFAULT_SCREEN_WIDTH) ? 2:3;
var DEFAULT_MODULE_WIDTH = 25;
var DEFAULT_MODULE_BGCOLOR = '#f0f0f0'; // default bgcolor for all layers
var DEFAULT_MODULE_BACKGROUND = (MODULE_IMAGE_PATH + 'default_background.gif');
var MODULE_FONT = ('<font size=2 face="verdana,arial,helvetica" color=#000000>');
var MODULE_CLOSE_FONT = ('</font>');
var MODULE_CELL_SPACING = 4; // the value of cellspacing in layout table
var MODULE_CELL_PADDING = 0; // the value of cellpadding in layout table
/*******************************************************************************
********************************************************************************
** ENTER THE IMAGES TO BE LOADED HERE. MAKE SURE YOU                          **
** INCREMENT LOAD_STRING PROPERLY, AND BE CAREFUL WITH THE                    **
```

-continued

```
 SPECIAL CHARACTERS AND COMMAS                                    
                                                                  
 all preloaded images are stored in PRELOADED_IMAGES[ ]           
*************************************************************************
*************************************************************************/
var LOAD_STRING = new Array( )); // init
// !SAMPLE! // LOAD_STRING[n] = '~theseimages/, *.tif, firstimagename, secondimagename
';
LOAD_STRING[0] = 'MOD_news,MOD_email,MOD_chat,MOD_homepage,MOD_travel';
/*
*   There are some simple rules to follow when adding LOAD_STRING(s):
*   1.  Try and keep distinct bunches of images on one line.
*   2.  Good to establish path && extension at start of string that
*       will persist through whole string.
*   3.  Use names that make sense.
*   Path is persistent, so once it is set that is the path that will be
*   assumed until the path is changed. Signify a path command with a tilde (~).
*   NOTE: DEFAULT IS 'images/', so you don't have to set this if 'image/' is the path;
*
*   Image type works in the same way. Signify current image type with an ampersand (*).
*   NOTE: DEFAULT IS '.gif', so you don't have to specify if '.gif' is proper extension;
*   ALSO: if you do change the extension, don't forget the period--ie. '*.jpg';
*
*   Simply list the images according to the format laid out. Remember that the filename
*   is determined by the name in the list in this way:
*
*   If my string is "IMAGE_BLUE,IMAGE_RED" the images that must exist (ie. will be
*   requested by the function) will be
'IMAGE_BLUE_0,IMAGE_BLUE_1,IMAGE_RED_0,IMAGE_RED_1';
*   '_0' will be the default(not on) image; '_1' will be the active(on) image on
rollover.
*
*/
// these are the items within the popup (4th gen only)
var POP_ITEMS = new Array('personalize', 'contact', 'help', 'info');
var POP_WIDTH = 96; // width of pop-up graphics
var POP_HEIGHT = 18; // height of pop-up graphics
``` gen_functions.js

The following gen_functions.js listing/file contains general functions that are referenced and used by the other functions defined in the listings contained within this section of the instant patent document. For example, the function getName( . . . ) is used to obtain a window module's name from system variables.

```
var fulFile = ' ';
var thisMOD = ' ';
var objREF = ' ';
var M = ' ';
var OBJ = ' ';
/*
 * flipImage( )
 * does image flipping based on PRELOADED array set in preloader.js
 */
        function flipImage(thisImage,thisState)
            {
                status = thisImage + '-' + thisState;
            }
/*
 * setVisibility( )
 * goes through all objects and sets their visibility
 */
        function setVisibility( )
            {
                for(x=0; x < MODULE_NAMES.length; x++)
                    {
                        if(!getModuleInfo('open',MODULE_NAMES[x]))
                            {
                                top.frames[0].showHide(MODULE_NAMES[x].0);
                            }
                    }
                    return;
            }
/*
 * getName(module name)
```

-continued

```
* returns the 'real' name of the module in CAPS
*
*/
    function getName(name)
        {
            var nn = name.substring(3,name.length);
                return(nn.toUpperCase( ));
        }
/*
* popAlert(string)
* simply pops an alert containing string
*
*/
    function popAlert(sendThis)
        {
            alert(sendThis);
        }
/*
* makeSpacer(width,height)
* call this to place a spacer graphic (ie. a transparent image that
* is set by the width && height values specified.
*
*/
    function makeSpacer(thisWidth,thisHeight)
        {
            var thisSpacer = ' ';
            thisSpacer = ('<img src=" ' + DEFAULT_IMAGE_PATH + SPACER + ' " width = ' +
thisWidth + ' height = ' + thisHeight + '>');
            return(thisSpacer);
        }
/*
* getModuleInfo(propertyName,MODname)
* returns boolean reflecting the truth of 'propertyName' in MODname
*
*/
    function getModuleInfo(propertyName,MODname)
        {
            if(propertyName == 'open') {return(MODULES[MODname].Open == 1);}
            if(propertyName == 'maximized') {return(MODULES[MODname].Maximized == 1);
}
        }
/*
* fetchFile(thisFilename,module name)
* loads an external file;
* if a 4th gen browser, switches layer without
* page refreshing.
*/
    function fetchFile(thisFilename,md)
        {
            fullFile = ('fetchFile.php3?fileName=' + thisFilename);
            if(!IS4) // if not 4th gen, nothing for now
                {
                    top.frames[0].location.href = fullFile;
                    return;
                }
            if(!IS_DRAGGABLE) // if we aren't loading into module window
                {
                    top.frames[0].scroll(0,0); // reset to top
            if(!thisFilename) // if no thisFilename, then hiding
                {
                    (N4) ? top.frames[0].document.output.visibility = 'hide':
top.frames[0].document.all.Eoutput.style.visibility = 'hidden';
                    top.FILEOPEN = 0; // flag no file
                    return;
                }
                if(N4)
                {
                    top.frames[0].document.output.visibility = 'show';
                    top.frames[0].document.output.src = fullFile;
                }
                    else
                        {
                            top.frames[0].document.all.loader.style.visibility = 'visible';
                            top.frames[0].document.all.Eoutput.style.visibility = 'visible';
                                top.frames[0].document.all.Eoutput.src = fullFile;
                        }
                    top.FILEOPEN = 1; // flag open file
```

-continued

```
                    }
                    else // if a draggable interface, load into sent module window.
                    {
                            // wrap output in a holding table--formatting reasons only
                            thisFilename = ('<table cellpadding=2 cellspacing=0 border=0><tr><td valign=top>' + thisFilename + TABLE_CLOSE_TABLE);
                            frames[0].document.all[md].innerHTML = (doControlBar(md,1) + thisFilename);
                    }
        }
``` preloader.js

The following preloader.js listing/file is a general purpose image pre-loader routine that stores 'rollover' image information for various buttons, etc. within a windows based CME provided in accordance with the present invention.

```
/*
 * preloader
 *
 * loads all rollover images. Will load based on a [filename] [boolean] idea, ie.
 * image_0,image_1 is base image (no rollover), and rollover image (image on).
 *
 * reads the array LOAD_STRING in var_delarations.js and preloads all the indicated
 * images as per above.
 */
/********************************************************************************
 * <<<<<<<<<<<<<<<<<<<<<<<<<<< !!IMPORTANT!! <<<<<<<<<<<<<<<<<<<<<<<<<           *
 *                                                                               *
 * ALL OF THE INFORMATION RELATING TO WHICH IMAGES WILL BE LOADED,               *
 * ALONG WITH INSTRUCTIONS ON HOW TO DO FILL LOAD_STRING[ ], ARE FOUND IN        *
 * THE INCLUDED FILE var_declarations.js;                                        *
 *                                                                               *
 *                          DO NOT MODIFY THIS FILE!!!!                          *
 ********************************************************************************/
if(document.images) // only runs on browsers that support image object
        {
        var currentPosition = 0; // pointer to current position in current LOAD_STRING;
        var currentCharacter = ' '; // keeps current character (char at currentPosition);
        var currentLoadString = 0; // which string we are on;
        var preloadTrack = 0; // keep track of how many elements are to be preloaded;
        var currentExtension = '.gif'; // default; can be altered in strings;
        var currentPath = DEFAULT_IMAGE_PATH; // default; can be altered in strings;
        var firstCharacter = ' '; // will be the first character in string when preloading
        var currentElement = ' '; // will be used to store the active element in PRELOAD;
        var currentImageLocation = ' '; // the src for PRELOADED_IMAGES array;
        var PRELOADED_IMAGES = new Array( );   // will be what image calls will reference;
                                               // will be multidimensional
        (PRELOADED_IMAGES[name] [on/off]);
        var onoffTrack = 0; // used to flip between on/off image values when preloading;
        var PRELOADED = new Array( );
        // store the length of total LOAD_STRING(s)
        var numberOfLoadStrings = LOAD_STRING.length;
        /*
         * the following construct will go through all LOAD_STRING(s) and split out on
         * commas. What we will end up with is PRELOADED filled with all distinct
         * elements contained in the various LOAD_STRING(s). These are either path sets,
         * or image extensions sets, or image names to preload (most often image names).
         *
         * These will then be sorted through, targeted, and sourced.
         *
         */
        for(currentLoadString=0; currentLoadString < numberOfLoadStrings; currentLoadString++)
                {
                        PRELOADED[preloadTrack] = ' '; // initialize so we can build the string
                        // determine the length of the current string
                        var currentStringLength = LOAD_STRING[currentLoadString].length;
                        for(currentPosition=0; currentPosition < currentStringLength; currentPosition++)
                                {
                                        // start splitting up the strings by commas;
                                        // (would use split( ), but that is not backwards-compatible)
                                        // get the current character
                                        currentCharacter = LOAD_STRING[currentLoadString].charAt(currentPosition);
                                        // check if this is a comma;
                                        // if it is, increment the key index for PRELOADED to store new element.
```

-continued

```
                    if(currentCharacter == ',')
                    {
                            preloadTrack++;
                            PRELOADED[preloadTrack] =' ';
                    }
                    else // if it isn't a comma, continue to build the element string.
                    {
                                    PRELOADED[preloadTrack] += currentCharacter;
                    }
            }
            // since the last key in PRELOADED does not end with a comma, if we don't
            // increment the key the next image name will be appended to last key value
                    preloadTrack++;
    }
    /*
     * now go through all elements and preload.
        * will store in PRELOADED_IMAGES[name] [on/off]
        *
        */
    for(xx=0; xx < PRELOADED.length; xx++)
        {
            // get the current element
                currentElement = PRELOADED[xx];
            // get the first character of the element;
                // essentially checking for (*) || (~)
            firstCharacter = currentElement.charAt(0);
                if(firstCharacter == '~') // path switch?
                {
                    // if path, then get the full path minus first character
                    currentPath = currentElement.substring(1,currentElement.length);
                }
                    else if(firstCharacter == '*') // extension switch?
                {
                            currentExtension = currentElement.substring(1,currentElement.length);
                }
                        else
                            {
                    /*
                            * now build the preloaded array;
                            * get currentPath + currentElement + on/off setting + currentExtension
                            * and attribute that image to PRELOADED_IMAGES[currentElement] ([0] || [1]).src
                            */
                            PRELOADED_IMAGES[currentElement] = new Array( );
                                for(onoffTrack = 0; onoffTrack <= 1; onoffTrack++)
                                {
                                            currentImageLocation = (currentPath + currentElement + '_' + onoffTrack + currentExtension);
                                        PRELOADED_IMAGES[currentElement] [onoffTrack] = new Image( );
                                        PRELOADED_IMAGES[currentElement] [onoffTrack].src = currentImageLocation;
                                        // turn this on to watch preloading information as it is being stored;
                                        // alert(currentElement + onoffTrack + '--' + currentImageLocation);
                            }
                        }
            }
    } // end document.images check
```

55 nav_buttons.js

The following nav_buftons.js listing/file creates navigation buttons which may be used to control general aspects of a web site that is windows based in accordance with the present invention and which may be take the form of the set of environment controls 210 shown in FIG. 2A.

```
/*
 * header section info
 * defines the default help/change/info buttons used in navButtons( )
 */
var NAV_HELP = ('<a href="javascript:top.navFunctions(\'help\')"><img src="' +
```

-continued

```
NAV_BUTTONS_PATH + 'help.gif' hspace=1 border=0></a>');
var NAV_CHANGE = ('<a href="javascript:top.navFunctions(\'change\')"><img src="' +
NAV_BUTTONS_PATH + 'change.gif' hspace=1 border=0></a>');
var NAV_INFO = ('<a href="javascript:top.navFunctions(\'info\')"><img src="' +
NAV_BUTTONS_PATH + 'info.gif' hspace=1 border=0></a>');
function navButtons( )
    {
        var tempName = ' ';
            var finalNavs = ' ';
            var maxNavButtons = 12; // max buttons per row (including numGenButtons)
            finalNavs += (NAV_CHANGE + NAV_HELP + NAV_INFO); // add in general nav functions
            // go through all modules and set their buttons
            for(x=0; x < MODULE_NAMES.length; x++)
                {
                    if(((x % maxNavButtons) == 0) && (x != 0)) // break row if more than 12
                        {
                            finalNavs += '</td><tr><tr><td align=right valign=top>';
                        }
                    tempName = MODULE_NAMES[x];
                        // establish mouseOut and mouseOver strings;
                        // sends top.flipImage(imagename,state,frame);
                        // (image name, on or off, which frame it is located in)
                        var mOVER = ('top.flipImage(\' ' + tempName + '\',1,0); return true;);
                    var mOUT = ('top.flipImage(\' ' + tempName + '\',1,0); return true;');
                        var realName = getName(tempName); // used for ALT
                    // write the image and href info
                    finalNavs += ('<a href="javascript:handleModule(\'show\',\' ' + tempName +
'/')" onMouseOver="' + mOVER + ' " onMouseOut=" ' + mOUT + ' "><img src=" ' + NAV_BUTTONS_PATH
+ tempName + '_0.gif' border=0 name=" ' + tempName + 'Nav" hspace=1 alt="OPEN' + realName
+ ' "></a>');
                }
                finalNavs += '<br>';
                // write output
                finalNavs += '<img src="images/blackbit.gif" width=100 height=20
name="navText"><br>';
                return(finalNavs);
    }
function navFunctions(thisFunc)
    {
        alert(thisFunc);
            return;
    }
``` module_draw.js

The following module_draw.js listing/file is used to cause rendering and layout of window modules (windows) within a WWW browser client CME by content rendering and layout modules of the same.

```
/******************************************************************************
 * VARIOUS ROUTINES AND FUNCTIONS TO HANDLE THE DRAWING OF MODULES *
 * AND STORING MODULE OBJECT INFORMATION                           *
 ******************************************************************************/
var currentName = ' '; // used when initializing table contents
var currentContent = ' '; // string that is built to output to modules
var numberOfModulesInColumn = 0; // set when writing column data
var styleSet = ' '; // set when using draggable interface; empty if not
var containerSize = ' '; // set when setting containing table
var controlbarOut = ' '; // set by doControlBar( ) to contain control bar info 4 modules
var IS_DRAGGABLE = (IE4) ? 1:0;
/*
 * simply get the number of modules per row, and
 * initialize columnTrack[ ] first dim;
 * 2nd dimension incremented and filled later.
 *
 */
var columnTrack = new Array( ); // array to hold column contents
for(x=0; x < MODULES_PER_ROW; x++) // < since numMod's starts counting at 1
    {
        columnTrack[x] = new Array( );
    }
var currentColumn = 0; // initialize column we are writing to
/***********************************************************
 * The following goes through all the object names and sorts them    *
 * into columns based on TOTAL_MODULE_COUNT;                         *
```

```
 * We end up with columnTrack[column] [numberOfModulesInColumn]     *
 **************************************************************/
for(var currentObject=0; currentObject < TOTAL_MODULE_COUNT; currentObject++)
    {
        currentName MODULE_NAMES[currentObject]; // get latest module name
        if(currentObject && ((currentobject % MODULES_PER_ROW) == 0))
            {
                // this runs whenever max column is reached;
                        // if at end (%MODULES_PER_ROW), reset to 0
                currentColumn = 0;
            }
                    /* The following handles the array indexing when adding a new
                        * module to a column. First it checks to see if any modules
                        * have been added to the column ('undefined' if not); if there
                        * are existing modules, simply set numberOfModulesInColumn to
                        * the length of the array (which is 1 higher than last index),
                        * and that becomes the array index for the new entry;
                        * if not, then set the index to zero(0))
                        */
                    numberOfModulesInColumn = (columnTrack[currentColumn] [0]) ?
columnTrack[currentColumn].length:0;
                // store the module name
                columnTrack[currentColumn] [numberOfModulesInColumn] = currentName;
                        // set the module's Column property
                        MODULES[currentName].Column = currentColumn;
                        // set the module's Row property
                        MODULES[currentName].Row = numberOfModulesInColumn;
                currentColumn++; // keeping track of which column we are in
}
/*
 * this loop will tell you final layout information;
 * enable it to receive (in alerts) a column-by-column list of
 * the object names that have been sorted into those columns
 * on initialization (into columnTrack):
 * ie. 0:0 MOD_news; 0:1 MOD_news; . . . 3:2 MOD_whatever;
 *
 * Good point to check what's going on in case of bugs.
 * for(y=0; y < MODULES_PER_ROW; y++)
 *  {
 *      for(z=0; z < columnTrack[y].length; z++)
 *          {
 *              alert(y + ':' + z + '=' + columnTrack[y] [z]);
 *          }
 *  }
 *
 */
function drawModulesInTables( )
    {
        // NOTE THAT THESE TABLE SETUP DEFINITIONS ONLY APPLY TO
            // TILED VERSION; DRAGGABLE VERSION SETS ITS OWN CONTAINER LATER VIA var styleSet
        var tableSetup = ('<table cellpadding=' + MODULE_CELL_PADDING + 'cellspacing=' +
MODULE_CELL_SPACING + ' width=100% border=0>');
            // initial(the left and right tables) TD setup
        var initTD = ('<td valign=top width=' + DEFAULT_MODULE_WIDTH + '%>');
                // fat(center) TD setup
                var fatTD = ('<td valign=top>');
                var moduleString = ' '; // clear it
                with(top.frames[0].document) // set ref to main window for output
                    {
                // set the holding table;
                        // draggable interface sets size to about 90%;
                        // regular goes 100%
                    moduleString = (IS_DRAGGABLE) ? ' ': (tableSetup + TABLE_TR);
                    writeln (moduleString); moduleString = ' ';
                        // go column by column and list all items in that column
                    for (var thisColumn=0; thisColumn < MODULES_PER_ROW; thisColumn++)
                        {
                            // following does the <td></td> functions based on which
                                // column we're on . . . if draggable interface, this is
                                // ignored just as above
                            if(!IS_DRAGGABLE)
                                {
                                // if one of the columns on the ends
                                    if((thisColumn == 0) || (thisColumn == (MODULES_PER_ROW -1)))
                                        {
                                            writeln(initTD);
                                        }
                                        else // if one of the central columns
                                        {
```

-continued

```
                                writeln(fatTD);
                                  }
                              }
                            // now go down the current column and write all the modules
                            // in order for that column
                            for(var thisKey=0; thisKey < columnTrack[thisColumn].length; thisKey++)
                                  {
                                      // NOTE: currentName is being reused here
                                      currentName = columnTrack[thisColumn] [thisKey];
                                          // gets the objects Text value (a string containing all
content)
                                          // and builds it into the string. then writes to screen.
                                      writeln(getModuleContents(currentName) + NEWLINE + NEWLINE);
                                          // clear them up so we don't have it sitting around in
memory
                                      currentContent = ' ';
                                      controlbarOut = ' ';
                                  }
                              // close the current column if not draggable
                              if(!IS_DRAGGABLE) {writeln(TABLE_CLOSE_TD)};
                          }
                      // close the holding table if this is not a draggable interface
                      moduleString += (IS_DRAGGABLE) ? ' ':(TABLE_CLOSE_TR + TABLE_CLOSE +
NEWLINE);
                                  writeln(moduleString);
                                  moduleString = ' ';
                  }
              return;
    }
    /************************************************
     * end drawModulesInTables( ) standard layout function *
     ************************************************/
    /********************************
     * end module container setup functions *
     ********************************/
    /*********************************************
     * getModuleContents(module_name)            *
     * Constructs the entire contents for a module; *
     * when called, it constructs a string (currentContent) *
     * and returns it;                           *
     * the same for floating or fixed modules, since *
     * it is only the positioning of the holding *
     * table that changes, not the layout        *
     *********************************************/
    function getModuleContents(thisName)
            {
                // this turns off further ouput in tiled version
                if(!IS_DRAGGABLE)
                        {
                            if(!getModuleInfo('open',thisName)) {return(' ');}
                        }
                // set the proper container for draggable items
                if(IS_DRAGGABLE && top.IE4)
                        {
                            styleSet = 'STYLE=\"position:absolute; top:' + MODULES[thisName].Yposition + ';
left:' + MODULES[thisName].Xposition + '; overflow:auto; border: 3 solid black;
background: #f0f0f0;/" ';
                        }
                OPEN_MOD = ('<SPAN ID=" ' + thisName + ' " ' + styleSet + '>');
                    currentContent += (NEWLINE + OPEN_MOD); // set the div ID
                    // start the 'border' table for non-draggable interface;
                    // essentially a relative table with cellpadding of 2 to create
                    // a 2 pixel black border around the content of the module
                    if(!IS_DRAGGABLE)
                        {
                            currentContent += (TABLE_STANDARD + TABLE_TR + TABLE_TD_BLACK);
                        }
                    // run the function to create the control bar for modules
                    currentContent += (doControlBar(thisName));
                /*
                    * now checking if module is minimized or maximized;
                    * if window isn't maximized, just return the header-bar table;
                    * only for non-draggable, tiled version
                */
                    if(!IS_DRAGGABLE)
                        {
                        if(!getModuleInfo('maximized',thisName)) // end if not maximized
                                {
                                    // add a spacer to separate this module from any below it;
```

-continued

```
                            // close holding table first!
                    currentContent += (TABLE_CLOSE_TABLE +
makeSpacer(100,MODULE_CELL_SPACING) + LINEBREAK + CLOSE_MOD);
                            return (currentContent);
                            }
                    }
                    // now set the nested table that will output the content
            currentContent += (TABLE_STANDARD + TABLE_TR + '<td bgcolor=' +
DEFAULT_MODULE_BGCOLOR + '>' + NEWLINE);
                    /****************************************************
                     * BEGIN THE MODULE CONTENTS HTML OUTPUT HERE *
                     ****************************************************
                     */
            currentContent += MODULE_FONT; // standard font set
                    /***********************************************************
                     * inserting the contents of this objects .Text string, which is   *
                     * the entire html code for that module, is an object variable    *
                     ***********************************************************/
            currentContent += (MODULES[thisName].Text);
                    // close the nested content table
                    currentContent += (MODULE_CLOSE_FONT + TABLE_CLOSE_TABLE + NEWLINE);
                    if(!IS_DRAGGABLE) // close the 'border' table for tiled version
                            {
                                    currentContent += TABLE_CLOSE_TABLE;
                            }
                    // close the MODULE
                    currentContent += (CLOSE_MOD + NEWLINE);
                    // add a spacer to separate this module from any below it
                    currentContent += (makeSpacer(100,MODULE_CELL_SPACING) + LINEBREAK);
                    // return the whole module contents
                    return (currentContent);
            }
/************************************************************
 * the function that appends to currentContent all information for the  *
 * control bar on top of modules (ie. the black bar with the title      *
 * and navigation buttons on top of the modules); if called on its      *
 * own, you can output currentContent and get its results               *
 ************************************************************/
*/
function doControlBar (barName)
    {
            controlbarOut = ' '; // make sure it's clear
            controlbarOut += ('<table cellpadding=0 cellspacing=0 border=0 width=100%>' +
TABLE_TR);
            controlbarOut += ('<td valign=top width=100 height=30 bgcolor=#000000>' +
NEWLINE);
            // write the modules graphical title--30 pixels high, arbitrary width
            controlbarOut += ('<img src=" ' + MODULE_IMAGE_PATH + barName + '.gif" id=" ' +
barName + 'pic">' + LINEBREAK + NEWLINE);
            controlbarOut += TABLE_CLOSE_TD;
            controlbarOut += ('<td valign=top align=right height=30 bgcolor=#000000>' +
NEWLINE);
                    /***********************************************
                     * write the window buttons (help, reduce, expand, close) *
                     ***********************************************/
            var realName = getName(barName); // used for ALT
            var MODULE_CLOSE = ('<a
href="javascript:top.frames[0].handleModule(\'close\',\' ' + barName + '\') "><img src=" ' +
MODULE_IMAGE_PATH + 'close.gif' border=0 hspace=0 vspace=0 alt="CLOSE ' + barName +
' "></a>');
            // no reduce on draggable
            var MODULE_REDUCE = (!IS_DRAGGABLE && getModuleInfo('maximized',barName)) ? ('<a
href="javascript:top.frames[0].handleModule(\'reduce\',\' ' + barName + '\')"><img src=" ' +
MODULE_IMAGE_PATH + 'reduce.gif' border=0 hspace=1 vspace=0 alt="MINIMIZE ' + realName +
' "></a>):' ';
            // no expand on draggable
            var MODULE_EXPAND = (!IS_DRAGGABLE && !getModuleInfo('maximized',barName)) ? ('<a
href="javascript:top.frames[0].handleModule(\'expand\',\' ' + barName + '\')"><img src=" ' +
MODULE_IMAGE_PATH + 'expand.gif' border=0 hspace=1 vspace=0 alt="MAXIMIZE ' + realName +
' "></a>):' ';
            var MODULE_HELP = ('<a href="javascript:top.frames[0].handleModule(\'help\',\' ' +
barName + '/')"><img src=" ' + MODULE_IMAGE_PATH + 'help.gif' border=0 hspace=1 vspace=0
alt="GET HELP REGARDING ' + realName + ' "></a>');
            controlbarOut += (MODULE_HELP + MODULE_REDUCE + MODULE_EXPAND + MODULE_CLOSE +
LINEBREAK + NEWLINE);
            // close the header-bar table
            controlbarOut += (TABLE_CLOSE_TABLE + NEWLINE);
                    return(controlbarOut);
```

```
}
``` resize.js

The following resize.js listing/file is used to allow window module resizing within a windows based CME. A user may adjust window sizes to suit particular content display attributes, to make a particular window module smaller, etc.

```
var theobject = null; //This gets a value as soon as a resize start
var thisLayer = null;
var elementID = ' ';
var thisID = ' ';
var lastModule = ' '; // stores the last active window
var elementID, xPos, yPos, cursorType, xMin, yMin;
function getDirection(elementID) {
            var xPos, yPos, offset, dir;
            dir = " ";
            xPos = window.event.offsetX;
            yPos = window.event.offsetY;
            offset = 8; //The distance from the edge in pixels
            if (yPos<offset) dir += "n";
            else if (yPos > elementID.offsetHeight-offset) dir += "s";
            if (xPos<offset) dir += "w";
            else if (xPos > elementID.offsetWidth-offset) dir += "e";
            return dir;
}
function doDown( ) {
            elementID = event.srcElement;
            if (elementID == null)
                    {
                            theobject = null;
                            return;
                    }
            // exit if isn't a proper MODULE layer || a sizeable image
            if((elementID.tagName != 'SPAN') && (elementID.className != top.SIZEABLE_CLASS))
                    {
                    return;
                    }
            dir = getDirection(elementID);
            if (dir == " ") return;
            theobject = new Object( ); // setup up a namespace
            theobject.elementID = elementID;
            theobject.dir = dir;
            theobject.grabx = window.event.clientX;
            theobject.graby = window.event.clientY;
            theobject.width = elementID.offsetWidth;
            theobject.height = elementID.offsetHeight;
            theobject.left = elementID.offsetLeft;
            theobject.top = elementID.offsetTop;
            window.event.returnValue = false;
            window.event.cancelBubble = true;
}
function doUp( )
            {
                    if (theobject != null) // clear any existing object
                            {
                                    theobject = null;
                            }
            }
function doMove( )
            {
                    xMin = top.MODULE_MIN_X;
                    yMin = top.MODULE_MIN_Y;
                elementID = event.srcElement;
cursorType = " "; // set default
if(elementID.tagName == 'SPAN')
            {
                    cursorType = getDirection(elementID); // get direction info
                    // set cursor
                    if(cursorType == " ") {cursorType = "default";}
                    else {cursorType += "-resize";} // the resize direction
            }
                    elementID.style.cursor = cursorType; // set the cursor
//Dragging starts here
            if(theobject != null) // if there is still an active object
```

-continued

```
{
    // check if we're mousing over the currently open module (ie. lastModule);
    // also check if this is a valid module;
    // if so, don't change z-index; if new module, then update z-index
    if(((theobject.elementID.id != lastModule) || (!lastModule)) &&
(theobject.elementID.id != ' '))
    {
        setZIndex(theobject.elementID.id);
        lastModule = theobject.elementID.id; // store current
    }
    if (dir.indexOf("e") != -1)
    {
        theobject.elementID.style.width = Math.max(xMin, theobject.width +
window.event.clientX-theobject.grabx);
    }
    if (dir.indexOf("s") != -1)
    {
        theobject.elementID.style.height = Math.max(yMin, theobject.height
+ window.event.clientY-theobject.graby);
    }
    if (dir.indexOf("w") != -1)
    {
        theobject.elementID.style.left = Math.min(theobject.left +
window.event.clientX-theobject.grabx, theobject.left + theobject.width - xMin);
        theobject.elementID.style.width = Math.max(xMin, theobject.width -
window.event.clientX + theobject.grabx);
    }
    // checking for n resize && cutting off sizing past top header
    if((dir.indexOf("n") != -1) && (window.event.clientY >
top.SCREEN_TOP_OFFSET))
    {
        theobject.elementID.style.top = Math.min(theobject.top +
window.event.clientY-theobject.graby, theobject.top + theobject.height - yMin);
        theobject.elementID.style.height = Math.max(yMin, theobject.height
- window.event.clientY + theobject.graby);
    }
    window.event.returnValue = false;
    window.event.cancelBubble = true;
}
}
```

The listings/files discussed above include various files which are used to create and allow manipulation of pop-up window modules and layers. Two main listings/files (javascript files) that are used to deliver such functionality: pops.js and pop_functions.js. Such javascript files are included in mainNew.html which was discussed above. Additionally, a function contained in the d&d.js javascript file (discussed above) handles an initial doubleclick operation that initiates a pop-up window module, layer, etc. ("pop-ups"). That additional function is referred to as "popMenu()."

In creating a pop-up, a content layer is first created to contain buttons which link to various functions/options/services (e.g., MCs) within a windows based web site which is manifested within a CME. The content of the first pop-up layer, are labels like 'INFO', 'CONTACT', 'PERSONALIZE'. The pop-up layer is actually created by calling a function contained in the pop.js file. In particular, the doPopo function is executed. The doPop( ) function is called from mainNew.html in the following manner: document.writeln(top.doPop( )). Once doPopo( ) executes, all the necessary HTML to draw the aforementioned buttons and handle mouse type clicks associated with the buttons within the pop-up window is created.

The CSS properties of the created pop-up are set in the following way: #popper {position:absolute; width:96; z-index:101; visibility:hidden;}. Such an instruction initializes the pop-up layer and sets its visibility to 'hidden'—e.g., the layer is invisible initially.

The second step is the handling of the layer. This entails dealing with users clicking on the generated control buttons (e.g., MCs). Button clicks are handled by the functions outlined in pop_functions.js. In particular, a function "checkPopper( )" is called by another function "popMenu( )" to retrieve all information concerning where the user has clicked on a web page within the active CME and where to display the pop-up. Once checkPopper( ) has run, popMenu then makes the pop-up visible and positions it in the proper place based on the variables set by checkPopper( ).

The second function in the javascript file pop_functions.js is "checkHide( )". Function checkHide( ) is called by the engage( ) function in the d&d.js javascript file. Function engage( ) is activated whenever a user performs a single-click on a windows based web site presented within an active CME. The first thing done by engage( ) is to execute function checkHide( ). Function checkHide( ) checks the position of the click—if the click is outside the box bounded by the pop-up layer, the pop-up is hidden and vice—versa.

Based on the foregoing comments, the following paragraphs discuss the listings/files for pop_functions.js, pops.js, and positioning_functions.js.

pop_functions.js

```javascript
                                                                pop_functions.js
var eButt = ' '; // set to mousebutton value (left,right)
var eName = ' '; // set to name of element(image) clicked on
var eX = ' '; // the mouse X
var eY = ' '; // the mouse Y
var eScrollTop = 0; // vertical scroll offset
popRef = ' '; // set to popper's document reference
var hasAppeared = 0; // flagged when popper open/closed
var edgeFactor = 40; // pop-up offset from bottom/right edge
var popWidth = top.POP_WIDTH; // width of pop-up buttons
// determine pop-up height (== element height * number of elements)
var popHeight = top.POP_HEIGHT * top.POP_ITEMS.length;
/*
 * These functions handle the pop-up;
 * are called on window events-specifically
 * doubleclick (
 */
function checkHide (e)
    {
        if(top.IE4) {e = window.event;}
        checkPopper(e);
        if(top.N4 && (hasAppeared == 1)) // check position for netcape
            {
                if ((eX < popRef.left) ||
                        (eX > popRef.left + popWidth) ||
                        (eY < popRef.top) ||
                (eY > popRef.top + popHeight))
                    {
                        popRef.visibility = (top.IE4) ? 'hidden':'hide'; // hide layer
                        hasAppeared = 0;
                    }
            }
            else if(top.IE4 && (hasAppeared == 1)) // check for ie4
                {
                    if(eName.indexOf("POP") == -1)
                        {
                            popRef.visibility = (top.IE4) ? 'hidden':'hide'; // hide layer
                            hasAppeared = 0;
                        }
                }
                        return true;
    }
function checkPopper (e)
    {
            // get obj ref
        popRef = (top.IE4) ? document.all['popper'].style document.layers['popper'];
            eButt = (top.IE4) ? e.button:e.which; // the value of the button click
        eName = (top.IE4) ? e.srcElement.name + ' ':e.target.name + ' '; // the name of any name element click hits
                eX = (top.IE4) ? e.clientX:e.pageX; // the X coord of the click
                eY = (top.IE4) ? e.clientY:e.pageY; // the Y coord of the click
        // now accomodate any scrolling that has occurred
        eY += eScrollTop = (top.IE4) ? document.body.scrollTop:0; // needed for ie4 only
        if((top.SCREEN_X - popWidth - edgeFactor) < eX) // check for right edge
            {
                eX -= popWidth; // shift left
            }
        if((top.SCREEN_Y + eScrollTop - popHeight - edgeFactor) < eY) // check bottom edge
            {
                eY -= popHeight; // shift up
            }
            return true;
    }
                                                                pops.js
var pops = ' ';
currPopItem = ' ';
function doPop( )
    {
        pops += '<span id="popper">\n';
            pops += ('<table cellpadding=1 cellspacing=0 border=0><tr><td valign=top bgcolor=#000000>');
            for(x=0; x < POP_ITEMS.length; x++)
                {
                    currPopItem = POP_ITEMS[x]; // set in var_declarations.js
                        pops += ('<a href="javascript:top.navFunctions(\' ' + currPopItem + '\')">');
                        pops += ('<img src=" ' + POPPER_PATH + currPopItem + '.gif' name="POP' + currPopItem + ' " width=' + POP_WIDTH + ' height=' +
```

-continued

```
POP_HEIGHT + ' border=0></a><br>\n');
            }
            pops += (TABLE_CLOSE_TABLE + '</span>');
                return(pops);
    }
                                    positioning_functions.js
var MODcolumn = 0;
var currRow = 0;
var MODcolumnMAX = 0;
var currRowTemp = 0;
var eee = ' ';
// getRef(rname)
// returns a browser specific module reference
function getRef (rname)
    {
        return((top.IE4) ? document.all[rname].style:document.layers[rname]);
    }
// simply reloads the interface;
// used for non-draggable interface changes
function pageRefresh( )
    {
        self.location.href = 'mainNew.html';
        return;
    }
// function that handles hide/show of modules in draggable environment.
// usese top.EV array to give browser specific settings
function showHide(mname,type,procedure)
    {
        eec = getRef(mname); // get obj ref
        eee.visibility = (top.IE4) ? top.EV[type]:top.NV[type]; // set it based on type(0/1)
            if(procedure != 'sizing')
                {
                eee.pixelTop = 110;
                eee.pixelLeft = 10;
                }
    }
// function to reposition modules in column (tiled) format;
// only runs on tiled environment;
// sends a module to either the top or bottom of the stack
// based on direction.
function reposition(thisMOD,direction)
    {
            MODcolumn = top.MODULES[thisMOD].Column; // current column
            MODcolumnMAX = top.columnTrack[MODcolumn].length - 1; // max row
            currRow = top.MODULES[thisMOD].Row; // current row
            limiter = (direction == 1) ? MODcolumnMAX:0; // set target position (bottom or
top)
            dirPointer = (direction == 1) ? 1:-1; // set direction (down or up)
                if(currRow != limiter) // don't run if already at limit
                {
                    // begin shifting modules
                    while(currRow != limiter)
                        {
                            // get next position
                            var nextRow = currRow + dirPointer;
                            // set new displaced columnTrack names
                            top.columnTrack[MODcolumn] [currRow] =
top.columnTrack[MODcolumn] [nextRow];
                            // reset Row property of moved MOD
                            top.MODULES[top.columnTrack[MODcolumn] [currRow]].Row = currRow;
                            currRow += dirPointer; // set next position and move on.
                        }
                    // set sent MOD to limiter position
                        top.columnTrack[MODcolumn] [limiter] = thisMOD;
                            // now reset the Row property of sent MOD
                            top.MODULES[top.columnTrack[MODcolumn] [limiter]].Row = limiter;
                }
                            return;
    }
function handleModule(thisACTION,MOD)
    {
            // if a draggable interface, on any action related to a module
            // make sure that module is on top
            if(top.IS_DRAGGABLE)
                {
                  setZIndex(MOD);
                }
                else // only run this for non draggable environment
                {
```

-continued

```
            // clear any loaded content (fetchfile with no values clears)
            top.fetchFile( );
            }
    var MM = top.MODULES[MOD].Maximized;
        var OO = top.MODULES[MOD].Open;
    if((thisACTION == 'reduce') && MM) // minimize
        {
            top.MODULES[MOD].Maximized = 0;
        reposition(MOD,1);
        pageRefresh( );
        }
        if((thisACTION == 'expand') && !MM) // maximize
        {
            top.MODULES[MOD].Maximized = 1;
                //reposition(MOD, 0);
                pageRefresh( );
        }
        if(thisACTION == 'close') // close
        {
            top.MODULES[MOD].Open = 0;
                if(top.IS_DRAGGABLE) // if a draggable layer, don't refresh just hide
                {
                    showHide(MOD,0);
                }
                else {pageRefresh( );}
        }
    if((thisACTION == 'show') && !OO) // open (also sets to maximized on open)
        {
            // set module object settings
            top.MODULES[MOD].Open = 1;
                top.MODULES[MOD].Maximized = 1;
                if(top.IS_DRAGGABLE) // if a draggable layer, don't refresh just show
                {
                    showHide(MOD,1);
                }
                else
                    {
                    reposition(MOD,0); // update the column listings
                    pageRefresh( );
                    }
        }
    }
}
```

Referring again to FIG. 4, processing proceeds after step S4-3 to step S4-4. At step S4-4, HTML and other related files are made available for service via an electronic data network such as the Internet and World Wide Web. In particular, the javascript file containing window module setup routines (module_setup.js as described above) along with the other files and functions listed above are made available for service from a server side system such as SVR system 102 to any number of client systems like or similar to client system 108. The service of files via the Internet and WWW such as via a WEB SERVER software package will be immediately understood by those skilled in the art.

Processing ends at step S4-6.

Referring now to FIGS. 5A and 5B, depicted therein is a flowchart that illustrates a process to facilitate window type operations within a WWW browser client CME. In particular, processing starts at step S5-1 and immediately proceeds to step S5-2.

At step S5-2, a user may start a WWW browser client within a personal data processing system such as within system 108. That is, a WWW browser client is loaded into a processing space within a personal data processing system and executed accordingly.

Next, the WWW browser client provides a CME environment within a browser display window and starts appropriate content rendering and layout models.

Next, at step S54, the user specifies a WWW web site uniform resource locator (URL—e.g., http://www.windows-website.com) from which to receive content (e.g., www.windows-website.com).

Next, at step S5-5, the WWW browser client accesses a network connection and the specified web site and receives windowed content including object instructions and content streams (e.g., such as those from news fees, stock feeds, other dynamic source, etc.) or related URLs, if any.

Next, at step S5-6, the WWW browser client manifests and causes display of received window content, HTML etc such as via dynamic (changing) display within a particular window module. Alternatively, depending on the implementation of a windows based CME that is actually developed and implemented in accordance with the present invention, content such as that received via a content stream may be displayed in an FSR, a layer, etc. within a CME.

Processing proceeds at the top of FIG. 5B.

At step S5-7, the user is permitted to alter window module states (e.g., size of a window, position of a window, minimization, maximization, etc.) within a CME of a WWW browser client without necessarily requiring screen refresh (e.g., is permitted to affect window module minimization, maximization, movement, resizing, etc.).

Next, at step S5-8, window content streams may be updated so that dynamic content may be displayed within window modules provided by the present invention.

Processing ends at step S5-9.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A software system configured to be downloaded by a network server system to a client system via an electronic data network and to control the operation of the network client, comprising:

an instruction package including instructions be processed by a web browser client running within the client system and to control said web browser client to generate a windowed content manifestation environment therein and to produce at least one window object within said content manifestation environment, said at least one window object associated with a set of controllable attributes and configured to manifest content therein, said controllable attributes configured to affect manifestation of said at least one window object by permitting said at least one window object to be controlled as a result of performing at least one of a moving operation, a resizing operation, a minimizing operation and a maximizing operation by said web browser client within said content manifestation environment without requiring said content manifestation environment to be refreshed.

2. The software system according to claim 1, wherein said instruction package controls said web browser client to allow a content stream received by the client system via the electronic data network to be manifested within said at least one window object within said content manifestation environment without causing said content manifestation environment to be refreshed.

3. The software system according to claim 1, wherein said instruction package controls said web browser client to allow a content stream received by said client system via the electronic data network to be manifested within said at least one window object within said content manifestation environment without causing said content manifestation environment to be refreshed.

4. The software system according to claim 1, wherein said content manifestation environment corresponds to a screen environment maintained by said client system.

5. The software system according to claim 1, wherein said instructions are hyper-text mark-up language instructions (HTML).

6. The software system according to claim 1, wherein said instructions are JAVA script instructions.

7. The software system according to claim 1, wherein said instruction package is received by said client system and the web browser client after the web browser client accesses a web site via the electronic data network, said web site serving said instruction package.

8. The software system according to claim 1, wherein said instruction package is intended to be served to said client system via the Internet.

* * * * *